US008896655B2

(12) United States Patent
Mauchly et al.

(10) Patent No.: US 8,896,655 B2
(45) Date of Patent: Nov. 25, 2014

(54) SYSTEM AND METHOD FOR PROVIDING DEPTH ADAPTIVE VIDEO CONFERENCING

(75) Inventors: J. William Mauchly, Berwyn, PA (US); Madhav V. Marathe, Cupertino, CA (US); Henry Fuchs, Chapel Hill, NC (US); Jan-Michael Frahm, Chapel Hill, NC (US)

(73) Assignees: Cisco Technology, Inc., San Jose, CA (US), part interest; University of North Carolina at Chapel Hill, Chapel Hill, NC (US), part interest ( * ) Notice: Subject to any disclaimer, the term of this patent is extended or adjusted under 35 U.S.C. 154(b) by 86 days.

(21) Appl. No.: 12/873,100

(22) Filed: Aug. 31, 2010

(65) Prior Publication Data
US 2012/0050458 A1  Mar. 1, 2012

(51) Int. Cl.
  *H04N 7/15* (2006.01)
  *H04N 5/247* (2006.01)
  *H04N 5/232* (2006.01)

(52) U.S. Cl.
  CPC ............... *H04N 7/15* (2013.01); *H04N 5/247* (2013.01); *H04N 5/23238* (2013.01)
  USPC ........................................................ 348/14.06

(58) Field of Classification Search
  USPC ......... 348/14.01, 14.08, 14.19, 14.07, 47, 64, 348/142, 588, 596, 14.16
  See application file for complete search history.

(56) References Cited

U.S. PATENT DOCUMENTS

| | | | |
|---|---|---|---|
| 2,911,462 | A | 11/1959 | Brady |
| D212,798 | S | 11/1968 | Dreyfuss |
| 3,793,489 | A | 2/1974 | Sank |
| 3,909,121 | A | 9/1975 | De Mesquita Cardoso |
| D270,271 | S | 8/1983 | Steele |
| 4,400,724 | A | 8/1983 | Fields |
| 4,473,285 | A | 9/1984 | Winter |

(Continued)

FOREIGN PATENT DOCUMENTS

| CN | 101953158 A | 1/2011 |
|---|---|---|
| CN | 102067593 | 5/2011 |

(Continued)

OTHER PUBLICATIONS

Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/ Publications/miller05cvmp.pdf, 10 pages.

(Continued)

*Primary Examiner* — Duc Nguyen
*Assistant Examiner* — Theodore Ndje
(74) *Attorney, Agent, or Firm* — Patent Capital Group

(57) ABSTRACT

A method is provided in one example and includes capturing panoramic image data through a first camera in a camera cluster, and capturing close-up image data through a second camera included as part of a spaced array of cameras. The presence of a user in a field of view of the second camera can be detected. The close-up image data and the panoramic image data can be combined to form a combined image. In more specific embodiments, the detecting includes evaluating a distance between the user and the second camera. The combined image can reflect a removal of a portion of panoramic image data associated with the user in a video conferencing environment.

19 Claims, 5 Drawing Sheets

(56) References Cited

U.S. PATENT DOCUMENTS

| | | | |
|---|---|---|---|
| 4,494,144 | A | 1/1985 | Brown |
| 4,750,123 | A | 6/1988 | Christian |
| 4,815,132 | A | 3/1989 | Minami |
| 4,827,253 | A | 5/1989 | Maltz |
| 4,853,764 | A | 8/1989 | Sutter |
| 4,890,314 | A | 12/1989 | Judd et al. |
| 4,961,211 | A | 10/1990 | Tsugane et al. |
| 4,994,912 | A | 2/1991 | Lumelsky et al. |
| 5,003,532 | A | 3/1991 | Ashida et al. |
| 5,020,098 | A | 5/1991 | Celli |
| 5,033,969 | A | 7/1991 | Kamimura |
| 5,136,652 | A | 8/1992 | Jibbe et al. |
| 5,187,571 | A | 2/1993 | Braun et al. |
| 5,200,818 | A | 4/1993 | Neta et al. |
| 5,243,697 | A | 9/1993 | Hoeber et al. |
| 5,249,035 | A | 9/1993 | Yamanaka |
| 5,255,211 | A | 10/1993 | Redmond |
| D341,848 | S | 11/1993 | Bigelow et al. |
| 5,268,734 | A | 12/1993 | Parker et al. |
| 5,317,405 | A | 5/1994 | Kuriki et al. |
| 5,337,363 | A | 8/1994 | Platt |
| 5,347,363 | A | 9/1994 | Yamanaka |
| 5,351,067 | A | 9/1994 | Lumelsky et al. |
| 5,359,362 | A | 10/1994 | Lewis et al. |
| D357,468 | S | 4/1995 | Rodd |
| 5,406,326 | A | 4/1995 | Mowry |
| 5,423,554 | A | 6/1995 | Davis |
| 5,446,834 | A | 8/1995 | Deering |
| 5,448,287 | A | 9/1995 | Hull |
| 5,467,401 | A | 11/1995 | Nagamitsu et al. |
| 5,495,576 | A | 2/1996 | Ritchey |
| 5,502,481 | A | 3/1996 | Dentinger et al. |
| 5,502,726 | A | 3/1996 | Fischer |
| 5,506,604 | A | 4/1996 | Nally et al. |
| 5,532,737 | A | 7/1996 | Braun |
| 5,541,639 | A | 7/1996 | Takatsuki et al. |
| 5,541,773 | A | 7/1996 | Kamo et al. |
| 5,570,372 | A | 10/1996 | Shaffer |
| 5,572,248 | A * | 11/1996 | Allen et al. ............... 348/14.1 |
| 5,587,726 | A | 12/1996 | Moffat |
| 5,612,733 | A | 3/1997 | Flohr |
| 5,625,410 | A | 4/1997 | Washino et al. |
| 5,666,153 | A | 9/1997 | Copeland |
| 5,673,401 | A | 9/1997 | Volk et al. |
| 5,675,374 | A | 10/1997 | Kohda |
| 5,689,663 | A | 11/1997 | Williams |
| 5,708,787 | A | 1/1998 | Nakano et al. |
| 5,713,033 | A | 1/1998 | Sado |
| 5,715,377 | A | 2/1998 | Fukushima et al. |
| D391,558 | S | 3/1998 | Marshall et al. |
| D391,935 | S | 3/1998 | Sakaguchi et al. |
| D392,269 | S | 3/1998 | Mason et al. |
| 5,729,471 | A | 3/1998 | Jain et al. |
| 5,737,011 | A | 4/1998 | Lukacs |
| 5,745,116 | A | 4/1998 | Pisutha-Arnond |
| 5,748,121 | A | 5/1998 | Romriell |
| D395,292 | S | 6/1998 | Vu |
| 5,760,826 | A | 6/1998 | Nayar |
| D396,455 | S | 7/1998 | Bier |
| D396,456 | S | 7/1998 | Bier |
| 5,790,182 | A | 8/1998 | Hilaire |
| 5,796,724 | A | 8/1998 | Rajamani et al. |
| D397,687 | S | 9/1998 | Arora et al. |
| D398,595 | S | 9/1998 | Baer et al. |
| 5,815,196 | A | 9/1998 | Alshawi |
| D399,501 | S | 10/1998 | Arora et al. |
| 5,818,514 | A | 10/1998 | Duttweiler et al. |
| 5,821,985 | A | 10/1998 | Iizawa |
| 5,825,362 | A | 10/1998 | Retter |
| D406,124 | S | 2/1999 | Newton et al. |
| 5,889,499 | A | 3/1999 | Nally et al. |
| 5,894,321 | A | 4/1999 | Downs et al. |
| D409,243 | S | 5/1999 | Lonergan |
| D410,447 | S | 6/1999 | Chang |
| 5,929,857 | A | 7/1999 | Dinallo et al. |
| 5,940,118 | A | 8/1999 | Van Schyndel |
| 5,940,530 | A | 8/1999 | Fukushima et al. |
| 5,953,052 | A | 9/1999 | McNelley et al. |
| 5,956,100 | A | 9/1999 | Gorski |
| 5,996,003 | A | 11/1999 | Namikata et al. |
| D419,543 | S | 1/2000 | Warren et al. |
| D420,995 | S | 2/2000 | Imamura et al. |
| 6,069,648 | A | 5/2000 | Suso et al. |
| 6,069,658 | A | 5/2000 | Watanabe |
| 6,088,045 | A | 7/2000 | Lumelsky et al. |
| 6,097,390 | A | 8/2000 | Marks |
| 6,097,441 | A | 8/2000 | Allport |
| 6,101,113 | A | 8/2000 | Paice |
| 6,124,896 | A | 9/2000 | Kurashige |
| 6,137,485 | A | 10/2000 | Kawai et al. |
| 6,148,092 | A | 11/2000 | Qian |
| D435,561 | S | 12/2000 | Pettigrew et al. |
| 6,167,162 | A | 12/2000 | Jacquin et al. |
| 6,172,703 | B1 | 1/2001 | Lee |
| 6,173,069 | B1 | 1/2001 | Daly et al. |
| D438,873 | S | 3/2001 | Wang et al. |
| D440,575 | S | 4/2001 | Wang et al. |
| 6,211,870 | B1 | 4/2001 | Foster |
| 6,226,035 | B1 | 5/2001 | Korein et al. |
| 6,243,130 | B1 | 6/2001 | McNelley et al. |
| 6,249,318 | B1 | 6/2001 | Girod et al. |
| 6,256,400 | B1 | 7/2001 | Takata et al. |
| 6,259,469 | B1 | 7/2001 | Ejima et al. |
| 6,266,082 | B1 | 7/2001 | Yonezawa et al. |
| 6,266,098 | B1 | 7/2001 | Cove et al. |
| D446,790 | S | 8/2001 | Wang et al. |
| 6,285,392 | B1 | 9/2001 | Satoda et al. |
| 6,292,188 | B1 | 9/2001 | Carlson et al. |
| 6,292,575 | B1 | 9/2001 | Bortolussi et al. |
| D450,323 | S | 11/2001 | Moore et al. |
| D453,167 | S | 1/2002 | Hasegawa et al. |
| D454,574 | S | 3/2002 | Wasko et al. |
| 6,356,589 | B1 | 3/2002 | Gebler et al. |
| 6,380,539 | B1 | 4/2002 | Edgar |
| 6,396,514 | B1 | 5/2002 | Kohno |
| 6,424,377 | B1 | 7/2002 | Driscoll, Jr. |
| D461,191 | S | 8/2002 | Hickey et al. |
| 6,430,222 | B1 | 8/2002 | Okadia |
| 6,459,451 | B2 | 10/2002 | Driscoll et al. |
| 6,462,767 | B1 | 10/2002 | Obata et al. |
| 6,493,032 | B1 | 12/2002 | Wallerstein et al. |
| D468,322 | S | 1/2003 | Walker et al. |
| 6,507,356 | B1 | 1/2003 | Jackel et al. |
| D470,153 | S | 2/2003 | Billmaier et al. |
| 6,515,695 | B1 | 2/2003 | Sato et al. |
| D474,194 | S | 5/2003 | Kates et al. |
| 6,573,904 | B1 | 6/2003 | Chun et al. |
| 6,577,333 | B2 | 6/2003 | Tai et al. |
| 6,583,808 | B2 | 6/2003 | Boulanger et al. |
| 6,590,603 | B2 | 7/2003 | Sheldon et al. |
| 6,591,314 | B1 | 7/2003 | Colbath |
| 6,593,955 | B1 | 7/2003 | Falcon |
| 6,593,956 | B1 | 7/2003 | Potts et al. |
| D478,090 | S | 8/2003 | Nguyen et al. |
| D478,912 | S | 8/2003 | Johnson |
| 6,611,281 | B2 | 8/2003 | Strubbe |
| D482,368 | S | 11/2003 | den Toonder et al. |
| 6,680,856 | B2 | 1/2004 | Schreiber |
| 6,693,663 | B1 | 2/2004 | Harris |
| 6,694,094 | B2 | 2/2004 | Partynski et al. |
| 6,704,048 | B1 | 3/2004 | Malkin et al. |
| 6,710,797 | B1 | 3/2004 | McNelley et al. |
| 6,751,106 | B2 | 6/2004 | Zhang et al. |
| D492,692 | S | 7/2004 | Fallon et al. |
| 6,763,226 | B1 | 7/2004 | McZeal |
| 6,768,722 | B1 | 7/2004 | Katseff et al. |
| D494,186 | S | 8/2004 | Johnson |
| 6,771,303 | B2 | 8/2004 | Zhang et al. |
| 6,774,927 | B1 | 8/2004 | Cohen et al. |
| D495,715 | S | 9/2004 | Gildred |
| 6,795,108 | B2 | 9/2004 | Jarboe et al. |
| 6,795,558 | B2 | 9/2004 | Matsuo et al. |
| 6,798,834 | B1 | 9/2004 | Murakami et al. |
| 6,801,637 | B2 | 10/2004 | Voronka et al. |

(56) References Cited

U.S. PATENT DOCUMENTS

| | | |
|---|---|---|
| 6,806,898 B1 | 10/2004 | Toyama et al. |
| 6,807,280 B1 | 10/2004 | Stroud et al. |
| 6,809,724 B1 | 10/2004 | Shiraishi et al. |
| 6,831,653 B2 | 12/2004 | Kehlet et al. |
| 6,844,990 B2 | 1/2005 | Artonne et al. |
| 6,850,266 B1 | 2/2005 | Trinca |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| D506,208 S | 6/2005 | Jewitt et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,925,613 B2 | 8/2005 | Gibson |
| 6,963,653 B1 | 11/2005 | Miles |
| D512,723 S | 12/2005 | Wirz |
| 6,980,526 B2 | 12/2005 | Jang et al. |
| 6,985,178 B1 | 1/2006 | Morita et al. |
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,030,890 B1 | 4/2006 | Jouet et al. |
| 7,031,311 B2 | 4/2006 | MeLampy et al. |
| 7,036,092 B2 | 4/2006 | Sloo et al. |
| D521,521 S | 5/2006 | Jewitt et al. |
| 7,043,528 B2 | 5/2006 | Schmitt et al. |
| 7,046,862 B2 | 5/2006 | Ishizaka et al. |
| D522,559 S | 6/2006 | Naito et al. |
| 7,057,636 B1 | 6/2006 | Cohen-Solal et al. |
| 7,057,662 B2 | 6/2006 | Malzbender |
| 7,058,690 B2 | 6/2006 | Maehiro |
| 7,061,896 B2 | 6/2006 | Jabbari et al. |
| D524,321 S | 7/2006 | Hally et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,095,455 B2 | 8/2006 | Jordan et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| D536,001 S | 1/2007 | Armstrong et al. |
| 7,158,674 B2 | 1/2007 | Suh |
| 7,161,942 B2 | 1/2007 | Chen et al. |
| 7,164,435 B2 | 1/2007 | Wang et al. |
| D536,340 S | 2/2007 | Jost et al. |
| D539,243 S | 3/2007 | Chiu et al. |
| 7,197,008 B1 | 3/2007 | Shabtay et al. |
| D540,336 S | 4/2007 | Kim et al. |
| D541,773 S | 5/2007 | Chong et al. |
| D542,247 S | 5/2007 | Kinoshita et al. |
| 7,221,260 B2 | 5/2007 | Berezowski et al. |
| D544,494 S | 6/2007 | Cummins |
| D545,314 S | 6/2007 | Kim |
| D547,320 S | 7/2007 | Kim et al. |
| 7,239,338 B2 | 7/2007 | Krisbergh et al. |
| 7,246,118 B2 | 7/2007 | Chastain et al. |
| D548,742 S | 8/2007 | Fletcher |
| 7,254,785 B2 | 8/2007 | Reed |
| D550,635 S | 9/2007 | DeMaio et al. |
| D551,184 S | 9/2007 | Kanou et al. |
| D551,672 S | 9/2007 | Wirz |
| 7,269,292 B2 | 9/2007 | Steinberg |
| 7,274,555 B2 | 9/2007 | Kim et al. |
| D554,664 S | 11/2007 | Van Dongen et al. |
| D555,610 S | 11/2007 | Yang et al. |
| D559,265 S | 1/2008 | Armstrong et al. |
| D560,225 S | 1/2008 | Park et al. |
| D560,681 S | 1/2008 | Fletcher |
| D561,130 S | 2/2008 | Won et al. |
| 7,336,299 B2 | 2/2008 | Kostrzewski |
| D563,965 S | 3/2008 | Van Dongen et al. |
| D564,530 S | 3/2008 | Kim et al. |
| D567,202 S | 4/2008 | Rieu Piquet |
| 7,352,809 B2 | 4/2008 | Wenger et al. |
| 7,353,279 B2 | 4/2008 | Durvasula et al. |
| 7,353,462 B2 | 4/2008 | Caffarelli |
| 7,359,731 B2 | 4/2008 | Choksi |
| 7,399,095 B2 | 7/2008 | Rondinelli |
| D574,392 S | 8/2008 | Kwag et al. |
| 7,411,975 B1 | 8/2008 | Mohaban |
| 7,413,150 B1 | 8/2008 | Hsu |
| 7,428,000 B2* | 9/2008 | Cutler et al. ............... 348/14.11 |
| D578,496 S | 10/2008 | Leonard |
| 7,440,615 B2 | 10/2008 | Gong et al. |
| D580,451 S | 11/2008 | Steele et al. |
| 7,450,134 B2 | 11/2008 | Maynard et al. |
| 7,471,320 B2 | 12/2008 | Malkin et al. |
| D585,453 S | 1/2009 | Chen et al. |
| 7,477,322 B2 | 1/2009 | Hsieh |
| 7,477,657 B1 | 1/2009 | Murphy et al. |
| 7,480,870 B2 | 1/2009 | Anzures et al. |
| D588,560 S | 3/2009 | Mellingen et al. |
| D589,053 S | 3/2009 | Steele et al. |
| 7,505,036 B1 | 3/2009 | Baldwin |
| D591,306 S | 4/2009 | Setiawan et al. |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2* | 6/2009 | Mori ............................. 382/103 |
| D595,728 S | 7/2009 | Scheibe et al. |
| D596,646 S | 7/2009 | Wani |
| 7,575,537 B2 | 8/2009 | Ellis |
| 7,577,246 B2 | 8/2009 | Idan et al. |
| D602,033 S | 10/2009 | Vu et al. |
| D602,453 S | 10/2009 | Ding et al. |
| D602,495 S | 10/2009 | Um et al. |
| 7,607,101 B1 | 10/2009 | Barrus |
| 7,610,352 B2 | 10/2009 | AlHusseini et al. |
| 7,610,599 B1 | 10/2009 | Nashida et al. |
| 7,616,226 B2 | 11/2009 | Roessler et al. |
| D608,788 S | 1/2010 | Meziere |
| 7,646,419 B2 | 1/2010 | Cernasov |
| D610,560 S | 2/2010 | Chen |
| 7,661,075 B2 | 2/2010 | Lahdesmaki |
| 7,664,750 B2 | 2/2010 | Frees et al. |
| D612,394 S | 3/2010 | La et al. |
| 7,676,763 B2 | 3/2010 | Rummel |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D617,806 S | 6/2010 | Christie et al. |
| D619,608 S | 7/2010 | Meziere |
| D619,609 S | 7/2010 | Meziere |
| D619,610 S | 7/2010 | Meziere |
| D619,611 S | 7/2010 | Meziere |
| 7,752,568 B2 | 7/2010 | Park et al. |

(56) References Cited

U.S. PATENT DOCUMENTS

| | | | |
|---|---|---|---|
| D621,410 S | 8/2010 | Verfuerth et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| D631,891 S | 2/2011 | Vance et al. |
| D632,698 S | 2/2011 | Judy et al. |
| 7,889,851 B2 | 2/2011 | Shah et al. |
| 7,890,888 B2 | 2/2011 | Glasgow et al. |
| 7,894,531 B1 | 2/2011 | Cetin et al. |
| D634,726 S | 3/2011 | Harden et al. |
| D634,753 S | 3/2011 | Loretan et al. |
| D635,569 S | 4/2011 | Park |
| D635,975 S | 4/2011 | Seo et al. |
| 7,920,158 B1 | 4/2011 | Beck et al. |
| D637,199 S | 5/2011 | Brinda |
| D638,025 S | 5/2011 | Saft et al. |
| D638,850 S | 5/2011 | Woods et al. |
| D638,853 S | 5/2011 | Brinda |
| 7,939,959 B2 | 5/2011 | Wagoner |
| D640,268 S | 6/2011 | Jones et al. |
| D642,184 S | 7/2011 | Brouwers et al. |
| 7,990,422 B2 | 8/2011 | Ahiska et al. |
| 7,996,775 B2 | 8/2011 | Cole et al. |
| 8,000,559 B2 | 8/2011 | Kwon |
| D646,690 S | 10/2011 | Thai et al. |
| D648,734 S | 11/2011 | Christie et al. |
| D649,556 S | 11/2011 | Judy et al. |
| 8,077,857 B1 | 12/2011 | Lambert |
| 8,081,346 B1 | 12/2011 | Anup et al. |
| 8,086,076 B2 | 12/2011 | Tian et al. |
| D652,050 S | 1/2012 | Chaudhri |
| D652,429 S | 1/2012 | Steele et al. |
| D653,245 S | 1/2012 | Buzzard et al. |
| D654,926 S | 2/2012 | Lipman et al. |
| D655,279 S | 3/2012 | Buzzard et al. |
| D656,513 S | 3/2012 | Thai et al. |
| 8,130,256 B2 * | 3/2012 | Trachtenberg et al. ..... 348/14.08 |
| 8,132,100 B2 | 3/2012 | Seo et al. |
| 8,135,068 B1 | 3/2012 | Alvarez |
| D656,948 S | 4/2012 | Knudsen et al. |
| D660,313 S | 5/2012 | Williams et al. |
| 8,179,419 B2 | 5/2012 | Girish et al. |
| 8,209,632 B2 | 6/2012 | Reid et al. |
| 8,219,404 B2 | 7/2012 | Weinberg et al. |
| 8,219,920 B2 | 7/2012 | Langoulant et al. |
| D664,985 S | 8/2012 | Tanghe et al. |
| 8,259,155 B2 | 9/2012 | Marathe et al. |
| D669,086 S | 10/2012 | Boyer et al. |
| D669,088 S | 10/2012 | Boyer et al. |
| D669,913 S | 10/2012 | Maggiotto et al. |
| 8,289,363 B2 | 10/2012 | Buckler |
| 8,299,979 B2 | 10/2012 | Rambo et al. |
| D670,723 S | 11/2012 | Khan et al. |
| D671,136 S | 11/2012 | Barnett et al. |
| D671,141 S | 11/2012 | Peters et al. |
| 8,315,466 B2 | 11/2012 | El-Maleh et al. |
| 8,339,499 B2 | 12/2012 | Ohuchi |
| 8,363,719 B2 | 1/2013 | Nakayama |
| 8,436,888 B1 | 5/2013 | Baldino et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0113827 A1 | 8/2002 | Perlman et al. |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0163538 A1 | 11/2002 | Shteyn |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0039778 A1 | 2/2004 | Read et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0221243 A1 | 11/2004 | Twerdahl et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0022130 A1 | 1/2005 | Fabritius |
| 2005/0024484 A1 | 2/2005 | Leonard |
| 2005/0034084 A1 | 2/2005 | Ohtsuki et al. |
| 2005/0039142 A1 | 2/2005 | Jalon et al. |
| 2005/0050246 A1 | 3/2005 | Lakkakorpi et al. |
| 2005/0081160 A1 | 4/2005 | Wee et al. |
| 2005/0099492 A1 | 5/2005 | Orr |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0149872 A1 | 7/2005 | Fong et al. |
| 2005/0154988 A1 | 7/2005 | Proehl et al. |
| 2005/0223069 A1 | 10/2005 | Cooperman et al. |
| 2005/0235209 A1 | 10/2005 | Morita et al. |
| 2005/0248652 A1 | 11/2005 | Firestone et al. |
| 2005/0251760 A1 | 11/2005 | Sato et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0048070 A1 | 3/2006 | Taylor et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0126894 A1 * | 6/2006 | Mori ........................... 382/103 |
| 2006/0152477 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0022388 A1 | 1/2007 | Jennings |

(56) References Cited

U.S. PATENT DOCUMENTS

| | | |
|---|---|---|
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0074123 A1 | 3/2007 | Omura et al. |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0157119 A1 | 7/2007 | Bishop |
| 2007/0159523 A1 | 7/2007 | Hillis et al. |
| 2007/0162866 A1 | 7/2007 | Matthews et al. |
| 2007/0183661 A1 | 8/2007 | El-Maleh et al. |
| 2007/0188597 A1 | 8/2007 | Kenoyer et al. |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0211716 A1 | 9/2007 | Oz et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0240073 A1 | 10/2007 | McCarthy et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0046840 A1 | 2/2008 | Melton et al. |
| 2008/0068446 A1 | 3/2008 | Barkley et al. |
| 2008/0069444 A1 | 3/2008 | Wilensky |
| 2008/0077390 A1 | 3/2008 | Nagao |
| 2008/0077883 A1 | 3/2008 | Kim et al. |
| 2008/0084429 A1 | 4/2008 | Wissinger |
| 2008/0119211 A1 | 5/2008 | Paas et al. |
| 2008/0134098 A1 | 6/2008 | Hoglund et al. |
| 2008/0136896 A1 | 6/2008 | Graham et al. |
| 2008/0148187 A1 | 6/2008 | Miyata et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0215993 A1 | 9/2008 | Rossman |
| 2008/0218582 A1* | 9/2008 | Buckler ............... 348/14.08 |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0256474 A1 | 10/2008 | Chakra et al. |
| 2008/0261569 A1 | 10/2008 | Britt et al. |
| 2008/0266380 A1 | 10/2008 | Gorzynski et al. |
| 2008/0267282 A1 | 10/2008 | Kalipatnapu et al. |
| 2008/0276184 A1 | 11/2008 | Buffet et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0012633 A1 | 1/2009 | Liu et al. |
| 2009/0037827 A1 | 2/2009 | Bennetts |
| 2009/0051756 A1 | 2/2009 | Trachtenberg |
| 2009/0079812 A1 | 3/2009 | Crenshaw et al. |
| 2009/0115723 A1 | 5/2009 | Henty |
| 2009/0119603 A1 | 5/2009 | Stackpole |
| 2009/0122867 A1 | 5/2009 | Mauchly et al. |
| 2009/0129753 A1 | 5/2009 | Wagenlander |
| 2009/0172596 A1 | 7/2009 | Yamashita |
| 2009/0174764 A1 | 7/2009 | Chadha et al. |
| 2009/0183122 A1 | 7/2009 | Webb et al. |
| 2009/0193345 A1 | 7/2009 | Wensley et al. |
| 2009/0204538 A1 | 8/2009 | Ley et al. |
| 2009/0207179 A1 | 8/2009 | Huang et al. |
| 2009/0207233 A1 | 8/2009 | Mauchly et al. |
| 2009/0207234 A1* | 8/2009 | Chen et al. ............... 348/14.09 |
| 2009/0217199 A1 | 8/2009 | Hara et al. |
| 2009/0228807 A1 | 9/2009 | Lemay |
| 2009/0244257 A1 | 10/2009 | MacDonald et al. |
| 2009/0256901 A1 | 10/2009 | Mauchly et al. |
| 2009/0260060 A1 | 10/2009 | Smith et al. |
| 2009/0265628 A1 | 10/2009 | Bamford et al. |
| 2009/0279476 A1 | 11/2009 | Li et al. |
| 2009/0324023 A1 | 12/2009 | Tian et al. |
| 2010/0005419 A1 | 1/2010 | Miichi et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0030389 A1 | 2/2010 | Palmer et al. |
| 2010/0042281 A1 | 2/2010 | Filla |
| 2010/0049542 A1 | 2/2010 | Benjamin et al. |
| 2010/0079355 A1* | 4/2010 | Kilpatrick et al. ............... 345/1.3 |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0158387 A1* | 6/2010 | Choi et al. ............... 382/195 |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0205543 A1 | 8/2010 | Von Werther et al. |
| 2010/0208078 A1 | 8/2010 | Tian et al. |
| 2010/0241845 A1 | 9/2010 | Alonso |
| 2010/0259619 A1 | 10/2010 | Nicholson |
| 2010/0262367 A1 | 10/2010 | Riggins et al. |
| 2010/0268843 A1 | 10/2010 | Van Wie et al. |
| 2010/0277563 A1 | 11/2010 | Gupta et al. |
| 2010/0306703 A1 | 12/2010 | Bourganel et al. |
| 2010/0313148 A1 | 12/2010 | Hochendoner et al. |
| 2010/0316232 A1 | 12/2010 | Acero et al. |
| 2010/0325547 A1 | 12/2010 | Keng et al. |
| 2010/0329511 A1 | 12/2010 | Yoon et al. |
| 2011/0008017 A1 | 1/2011 | Gausereide |
| 2011/0029868 A1 | 2/2011 | Moran et al. |
| 2011/0032368 A1 | 2/2011 | Pelling |
| 2011/0039506 A1 | 2/2011 | Lindahl et al. |
| 2011/0063440 A1 | 3/2011 | Neustaedter et al. |
| 2011/0063467 A1 | 3/2011 | Tanaka |
| 2011/0082808 A1 | 4/2011 | Beykpour et al. |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0113348 A1 | 5/2011 | Twiss et al. |
| 2011/0164106 A1 | 7/2011 | Kim |
| 2011/0193982 A1 | 8/2011 | Kook et al. |
| 2011/0202878 A1 | 8/2011 | Park et al. |
| 2011/0225534 A1 | 9/2011 | Wala |
| 2011/0242266 A1 | 10/2011 | Blackburn et al. |
| 2011/0249081 A1 | 10/2011 | Kay et al. |
| 2011/0249086 A1 | 10/2011 | Guo et al. |
| 2011/0276901 A1 | 11/2011 | Zambetti et al. |
| 2011/0279627 A1 | 11/2011 | Shyu |
| 2011/0319885 A1 | 12/2011 | Skwarek et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |
| 2012/0226997 A1 | 9/2012 | Pang |
| 2012/0266082 A1 | 10/2012 | Webber |
| 2012/0297342 A1 | 11/2012 | Jang et al. |
| 2012/0327173 A1 | 12/2012 | Couse et al. |

(56) References Cited

U.S. PATENT DOCUMENTS

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 22777308 | 1/2011 |
| GB | 2 294 605 A | 5/1996 |
| GB | 2336266 | 10/1999 |
| GB | 2 355 876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2005/031001 A3 | 2/2005 |
| WO | WO2006/072755 | 7/2006 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

Minoru from Novo is the worlds first consumer 3D Webcam, Dec. 11, 2008; http://www.minoru3d.com; 4 pages.

Mitsubishi Electric Research Laboratories, copyright 2009 [retrieved and printed on Feb. 26, 2009], http://www.merl.com/projects/3dtv, 2 pages.

National Training Systems Association Home—Main, Interservice/Industry Training, Simulation & Education Conference, Dec. 1-4, 2008; http://ntsa.metapress.com/app/home/main.asp?referrer=default; 1 page.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.

OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.

OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnIOptoLFWJanuary132010.html; 2 pages.

OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.

OptoIQ, "Vision Systems Design—Machine Vision and Image Processing Technology," [retrieved and printed on Mar. 18, 2010], http://www.optoiq.com/index/machine-vision-imaging-processing.html; 2 pages.

Payatagool, Chris, "Orchestral Manoeuvres in the Light of Telepresence," Telepresence Options, Nov. 12, 2008; http://www.telepresenceoptions.com/2008/11/orchestral_manoeuvres; 2 pages.

PCT International Preliminary Report on Patentability mailed Aug. 26, 2010 for PCT/US2009/001070; 10 pages.

PCT International Preliminary Report on Patentability mailed Oct. 7, 2010 for PCT/US2009/038310; 10 pages.

PCT International Report of Patentability mailed May 15, 2006, for PCT International Application PCT/US2004/021585, 6 pages.

PCT Notification of Transmittal of the International Search Report and the Written Opinion of the International Searching Authority, or the Declaration, PCT Application No. PCT/US2009/064061 mailed Feb. 23, 2010; 14 pages.

Pixel Tools "Rate Control and H.264: H.264 rate control algorithm dynamically adjusts encoder parameters," [retrieved and printed on Jun. 10, 2010] ; 7 pages. http://www.pixeltools.om/rate_control_paper.html.

Radhika, N., et al., "Mobile Dynamic reconfigurable Context aware middleware for Adhoc smart spaces," vol. 22, 2008, 3 pages http://www.acadjournal.com/2008/V22/part6/p7.

Rayvel Business-to-Business Products, copyright 2004 [retrieved and printed on Feb. 24, 2009], http://www.rayvel.com/b2b.html; 2 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

Robust Face Localisation Using Motion., Colour & Fusion; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.

Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.

School of Computing, "Bluetooth over IP for Mobile Phones," 2005; http://www.computing.dcu.ie/wwwadmin/fyp-abstract/list/fyp_details05.jsp?year=2005&number=51470574; 1 page.

Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.

SENA, "Industrial Bluetooth," [retrieved and printed on Apr. 22, 2009] http://www.sena.com/products/industrial_bluetooth; 1 page.

Shaffer, Shmuel, "Translation—State of the Art" presentation; Jan. 15, 2009; 22 pages.

Shi, C. et al., "Automatic Image Quality Improvement for Videoconferencing," IEEE ICASSP May 2004; http://research.microsoft.com/pubs/69079/0300701.pdf; 4 pages.

Shum, H.-Y, et al., "A Review of Image-Based Rendering Techniques," in SPIE Proceedings vol. 4067(3); Proceedings of the Conference on Visual Communications and Image Processing 2000, Jun.

(56) References Cited

OTHER PUBLICATIONS 20-23, 2000, Perth, Australia; pp. 2-13; https://research.microsoft.com/pubs/68826/review_image_rendering.pdf.

Smarthome, "IR Extender Expands Your IR Capabilities," [retrieved and printed on Apr. 22, 2009], http://www.smarthome.com/8121.html; 3 pages.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN: 0277-786X; XP007905596; pp. 78-88.

Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Super Home Inspectors or Super Inspectors, [retrieved and printed on Mar. 18, 2010] http://www.umrt.com/PageManager/Default.aspx/PageID=2120325; 3 pages.

Total immersion, Video Gallery, copyright 2008-2009 [retrieved and printed on Feb. 26, 2009], http://www.t-immersion.com/en,video-gallery,36.html, 1 page.

Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.

Tsapatsoulis, N., et al., "Face Detection for Multimedia Applications," Proceedings of the ICIP Sep. 10-13, 2000, Vancouver, BC, Canada; vol. 2, pp. 247-250.

Tsapatsoulis, N., et al., "Face Detection in Color Images and Video Sequences," 10th Mediterranean Electrotechnical Conference (MELECON), May 29-31, 2000; vol. 2; pp. 498-502.

Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.

Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

"Wi-Fi Protected Setup," from Wikipedia, Sep. 2, 2010, 3 pages http://en.wikipedia.org/wiki/Wi-Fi_Protected_Setup.

U.S. Appl. No. 12/877,833, filed Sep. 8, 2010, entitled "System and Method for Skip Coding During Video Conferencing in a Network Environment Environment," Inventor[s]: Dihong Tian et al.

U.S. Appl. No. 12/907,914, filed Oct. 19, 2010, entitled "System and Method for Providing Videomail in a Network Environment," Inventor[s]: David J. Mackie et al.

U.S. Appl. No. 12/907,919, filed Oct. 19, 2010, entitled "System and Method for Providing Connectivity in a Network Environment," Inventor[s]: David J. Mackie et al.

U.S. Appl. No. 12/907,927, filed Oct. 19, 2010, entitled "System and Method for Providing a Paring Mechanism in a Video Environment," Inventor[s]: Gangfeng Kong et al.

Andersson, L., et al, "LDP Specification," Network Working Group, RFC 3036, Jan. 2001, 133 pages; http://tools.ietf.org/html/rfc3036.

Arrington, Michael, "eJamming—Distributed Jamming," TechCrunch; Mar. 16, 2006; http://www.techcrunch.com/2006/03/16/ejamming-distributed-jamming/; 1 page.

Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.

Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.

Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.

Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24.

Chan, Eric, et al., "Experiments on block-matching techniques for video coding," Multimedia Systems; 9 Springer-Verlag 1994, Multimedia Systems (1994) 2 pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc. US, Jan. 1, 2000, pp. 327-333; http://citeseerx.ist.psu.edu/viewdoc/summary?doi=10.1.1.35.1287.

Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.

"Cisco Expo Germany 2009 Opening," Posted on YouTube on May 4, 2009; http://www.youtube.com/watch?v=SDKsaSlz4MK; 2 pages.

Cisco: Bill Mauchly and Mod Marathe; UNC: Henry Fuchs, et al., "Depth-Dependent Perspective Rendering," Apr. 15, 2008; 6 pages.

Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.

Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.

Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.

Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.

Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1page.

DVE Digital Video Enterprises, "DVE Tele-Immersion Room," [retrieved and printed on Feb. 5, 2009] http://www.dvetelepresence.com/products/immersion_room.asp; 2 pages.

"Dynamic Displays," copyright 2005-2008 [retrieved and printed on Feb. 24, 2009] http://www.zebraimaging.com/html/lighting_display.html, 2 pages.

(56) References Cited

OTHER PUBLICATIONS

ECmag.com, "IBS Products," Published Apr. 2009; http://www.ecmag.com/index.cfm?fa=article&articleID=10065; 2 pages.
eJamming Audio, Learn More; [retrieved and printed on May 27, 2010] http://www.ejamming.com/learnmore/; 4 pages.
Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.
Farrukh, A., et al., Automated Segmentation of Skin-Tone Regions in Video Sequences, Proceedings IEEE Students Conference, ISCON_apos_02; Aug. 16-17, 2002; pp. 122-128.
Fiala, Mark, "Automatic Projector Calibration Using Self-Identifying Patterns," National Research Council of Canada, Jun. 20-26, 2005; http://www.procams.org/ procams2005/papers/procams05-36.pdf; 6 pages.
Foote, J. et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.
"France Telecom's Magic Telepresence Wall," Jul. 11, 2006; http://www.humanproductivitylab.com/archive_blogs/2006/07/11/france_telecoms_magic_telepres_1.php; 4 pages.
Freeman, Professor Wilson T., Computer Vision Lecture Slides, "6.869 Advances in Computer Vision: Learning and Interfaces," Spring 2005; 21 pages.
Gemmell, Jim, et al., "Gaze Awareness for Video-conferencing: A Software Approach," IEEE MultiMedia, Oct.-Dec. 2000; vol. 7, No. 4, pp. 25-35.
Gotchev, Atanas, "Computer Technologies for 3D Video Delivery for Home Entertainment," Internationai Conference on Computer Systems and Technologies; CompSysTech, Jun. 12-13, 2008; http://ecet.ecs.ru.acad.bg/cst08/docs/cp/Plenary/P.1.pdf; 6 pages.
Gries, Dan, "3D Particles Experiments in AS3 and Flash CS3, Dan's Comments," [retrieved and printed on May 24, 2010] http://www.flashandmath.com/advanced/fourparticles/notes.html; 3 pages.
Guernsey, Lisa, "Toward Better Communication Across the Language Barrier," Jul. 29, 1999; http://www.nytimes.com/1999/07/29/technology/toward-better-communication-across-the-language-barrier.html; 2 pages.
Guili, D., et al., "Orchestral: A Distributed Platform for Virtual Musical Groups and Music Distance Learning over the Internet in JavaTM Technology"; [retrieved and printed on Jun. 6, 2010] http://ieeexplore.ieee.org/stamp/stamp.jsp?tp=&arnumber=778626; 2 pages.
Habill, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.
He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.
Holographic imaging, "Dynamic Holography for scientific uses, military heads up display and even someday HoloTV Using TI's DMD," [retrieved and printed on Feb. 26, 2009] http://innovation.swmed.edu/ research/instrumentation/res_inst_dev3d.html; 5 pages.
Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.
Infrared Cameras TVS-200-EX, [retrieved and printed on May 24, 2010] http://www.electrophysics.com/Browse/Brw_ProductLineCategory.asp?CategoryID=184&Area=IS; 2 pages.
IR Distribution Category @ Envious Technology, "IR Distribution Category," [retrieved and printed on Apr. 22, 2009] http://www.envioustechnology.com.au/ products/product-list.php?CID=305; 2 pages.
IR Trans—Products and Orders—Ethernet Devices, [retrieved and printed on Apr. 22, 2009] http://www.irtrans.de/en/shop/lan.php; 2 pages.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.
Itoh, Hiroyasu, et al., "Use of a gain modulating framing camera for time-resolved imaging of ceiluiar phenomena," SPIE vol. 2979, 1997, pp. 733-740.
Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.
Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.
Kannangara, C.S., et al., "Low Complexity Skip Prediction for H.264 through Langrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.
U.S. Appl. No. 12/781,722, filed May 17, 2010 entitled "System and Method for Providing Retracting Optics in a Video Conferencing Environment," Inventor(s): Joseph T. Friel, et al.
U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/950,786, filed Nov. 19, 2010, entitled "System and Method for Providing Enhanced Video Processing in a Network Environment," Inventor[s]: David J. Mackie.
U.S. Appl. No. 12/946,704, filed Nov. 15, 2010, entitled "System and Method for Providing Enhanced Graphics in a Video Environment." Inventors: John M. Kanalakis, Jr., et al.
U.S. Appl. No. 12/957,116, filed Nov. 30, 2010, entitled "System and Method for Gesture Interface Control," Inventors: Shuan K. Kirby, et al.
U.S. Appl. No. 13/036,925, filed Feb. 28, 2011 ,entitled "System and Method for Selection of Video Data in a Video Conference Environment," Inventor(s) Sylvia Olayinka Aya Manfa N'guessan.
U.S. Appl. No. 12/939,037, filed Nov. 3, 2010, entitled "System and Method for Managing Flows in a Mobile Network Environment," Inventors; Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s): Ashok T. Desai et al.
Design U.S. Appl. No. 29/369,951, filed Sep. 15, 2010, entitled "Video Unit With Integrated Features," Inventor(s): Kyle A. Buzzard et al.
Design U.S. Appl. No. 29/375,458, filed Sep. 22, 2010, entitled "Video Unit With Integrated Features," Inventor(s): Kyle A. Buzzard et al.
Design U.S. Appl. No. 29/375,619, filed Sep. 24, 2010, entitled "Free-Standing Video Unit," Inventor(s): Ashok T. Desai et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.

(56) References Cited

OTHER PUBLICATIONS

Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis, Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Konalakis, Jr., et al.
U.S. Appl. No. 13/096,772, filed Apr. 28, 2011, entitled "System and Method for Providing Enhanced Eye Gaze in a Video Conferencing Environment," Inventor(s): Charles C. Byers.
U.S. Appl. No. 13/106,002, filed May 12, 2011, entitled "System and Method for Video Coding in a Dynamic Environment," Inventors: Dihong Tian et al.
U.S. Appl. No. 13/098,430, filed Apr. 30, 2011, entitled "System and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers.
U.S. Appl. No. 13/298,022, filed Nov. 16, 2011, entitled "System and Method for Alerting a Participant in a Video Conference," Inventor(s): TiongHu Lian, et al.
Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.
Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.
Keijser, Jeroen, et al., "Exploring 3D Interaction in Alternate Control-Display Space Mappings," IEEE Symposium on 3D User Interfaces, Mar. 10-11, 2007, pp. 17-24.
Kim, Y.H., et al., "Adaptive mode decision for H.264 encoder," Electronics letters, vol. 40, Issue 19, pp. 1172-1173, Sep. 2004; 2 pages.
Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.
Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.
Lawson, S., "Cisco Plans TelePresence Translation Next Year," Dec. 9, 2008; http://www.pcworld.com/ article/155237/.html?tk=rss_news; 2 pages.
Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.
Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.
Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2F-viewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.
Chien et al., "Efficient moving Object Segmentation Algorithm Using Background Registration Technique," IEEE Transactions on Circuits and Systems for Video Technology, vol. 12, No. 7, Jul. 2002, 10 pages.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Digital Video Enterprises, "DVE Eye Contact Silhouette," 1 page, © DVE 2008; http://www.dvetelepresence.com/products/eyeContactSilhouette.asp.
Dornaika F., et al., "Head and Facial Animation Tracking Using Appearance-Adaptive Models and Particle Filters," 20040627; 20040627-20040602, Jun. 27, 2004, 22 pages; HEUDIASY Research Lab, http://eprints.pascal-network.org/archive/00001231/01/rtvhci_chapter8.pdf.
Eisert, Peter, ""Immersive 3-D Video Conferencing: Challenges, Concepts and Implementations,"" Proceedings of SPIE Visual Communications and Image Processing (VCIP), Lugano, Switzerland, Jul. 2003; 11 pages; http://iphome.hhi.de/eisert/papers/vcip03.pdf.
Garg, Ashutosh, et al., ""Audio-Visual ISpeaker Detection Using Dynamic Bayesian Networks,"" IEEE International Conference on Automatic Face and Gesture Recognition, 2000 Proceedings, 7 pages; http://www.ifp.illinois.edu/~ashutosh/papers/FG00.pdf.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Gluckman, Joshua, et al., "Rectified Catadioptric Stereo Sensors," 8 pages, retrieved and printed on May 17, 2010; http://cis.poly.edu/~gluckman/papers/cvpr00.pdf.
Gundavelli, S., et al., "Proxy Mobile IPv6," Network Working Group, RFC 5213, Aug. 2008, 93 pages; http://tools.ietf.org/pdf/rfc5213.pdf.
Gussenhoven, Carlos, "Chapter 5 Transcription of Dutch Intonation," Nov. 9, 2003, 33 pages; http://www.ru.nl/publish/pages/516003/todisun-ah.pdf.
Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.
Hammadi, Nait Charif et al., ""Tracking the Activity of Participants in a Meeting,"" Machine Vision and Applications, Springer, Berlin, De Lnkd—DOI:10.1007/S00138-006-0015-5, vol. 17, No. 2, May 1, 2006, pp. 83-93, XP019323925; http://citeseerx.ist.psu.edu/viewdoc/summary?doi=10.1.1.106.9832.
Hepper, D., "Efficiency Analysis and Application of Uncovered Background Prediction in a Low BitRate Image Coder," IEEE Transactions on Communications, vol. 38, No. 9, pp. 1578-1584, Sep. 1990.
Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.
Jamoussi, Bamil, "Constraint-Based LSP Setup Using LDP," MPLS Working Group, Sep. 1999, 34 pages; http://tools.ietf.org/html/draft-ietf-mpls-cr-ldp-03.
Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.
"Jong-Gook Ko et al., ""Facial Feature Tracking and Head Orientation-Based Gaze Tracking,"" ITC-CSCC 2000, International Technical Conference on Circuits/Systems, Jul. 11-13, 2000, 4 pages; http://www.umiacs.umd.edu/~knkim/paper/itc-cscc-2000-jgko.pdf".
Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.

(56) References Cited

OTHER PUBLICATIONS

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].

Lambert, "Polycom Video Communications," © 2004 Polycom, Inc., Jun. 20, 2004 http://www.polycom.com/global/documents/whitepapers/video_communications_h.239_people_content_polycom_patented_technology.pdf.

Liu, Shan, et al., ""Bit-Depth Scalable Coding for High Dynamic Range Video," SPIE Conference on Visual Communications and Image Processing, Jan. 2008; 12 pages http://www.merl.com/papers/docs/TR2007-078.pdf".

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrI.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Nakaya, Y., et al. ""Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203".

Patterson, E.K., et al., ""Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf".

Perez, Patrick, et al., ""Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480".

Potamianos, G., et a., ""An Image Transform Approach for HMM Based Automatic Lipreading,"" in Proceedings of IEEE ICIP, vol. 3, 1998, 5 pages http://citeseerx.ist.psu.edu/viewdoc/summary?doi=10.1.1.13.6802.

Rikert, T.D., et al., ""Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472".

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.

Tan, Kar-Han, et al., ""Appearance-Based Eye Gaze Estimation," In Proceedings IEEE WACV'02, 2002, 5 pages http://citeseer.ist.psu.edu/viewdoc/summary?doi=10.1.1.19.8921".

Trevor Darrell, "A Real-Time Virtual Mirror Display," 1 page, Sep. 9, 1998; http://people.csail.mit.edu/trevor/papers/1998-021/node6.html.

Veratech Corp., "Phantom Sentinel," © VeratechAero 2006, 1 page; http://www.veratechcorp.com/phantom.html.

Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.

Wachs, J., et al., "A Real-time Hand Gesture System Based on Evolutionary Search," Vision, $3^{rd}$ Quarter 2006, vol. 22, No. 3, 18 pages; http://web.ics.purdue.edu/~jpwachs/papers/3q06vi.pdf.

"3D Particles Experiments in AS3 and Flash CS3," [retrieved and printed on Mar. 18, 2010]; 2 pages; http://www.flashandmath.com/advanced/fourparticles/notes.html.

3G, "World's First 3G Video Conference Service with New TV Commercial," Apr. 28, 2005, 4 pages; http://www.3g.co.uk/PR/April2005/1383.htm.

"Eye Tracking," from Wikipedia, (printed on Aug. 31, 2011) 12 pages; http://en.wikipedia.org/wiki/Eye_tracker.

"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.

"Vocative Case," from Wikipedia, [retrieved and printed on Mar. 3, 2011] 11 pages; http://en.wikipedia.org/wiki/Vocative_case.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.

"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

active8-3D—Holographic Projection—3D Hologram Retail Display & Video Project, [retrieved and printed on Feb. 24, 2009], http://www.activ8-3d.co.uk/3d_holocubes; 1 page.

"Andreopoulos, Yiannis, et al., ""In-Band Motion Compensated Temporal Filtering,"" Signal Processing: Image Communication 19 (2004) 653-673, 21 pages http://medianetlab.ee.ucla.edu/papers/011.pdf".

"Arulampalam, M. Sanjeev, et al., ""A Tutorial on Particle Filters for Online Nonlinear/Non-Gaussian Bayesian Tracking,"" IEEE Transactions on Signal Processing, vol. 50, No. 2, Feb. 2002, 15 pages http://www.cs.ubc.ca/~murphyk/Software/Kalman/ParticleFilterTutorial.pdf".

Awduche, D., et al., "Requirements for Traffic Engineering over MPLS," Network Working Group, RFC 2702, Sep. 1999, 30 pages; http://tools.ietf.org/pdf/rfc2702.pdf.

Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.

Boros, S., "Policy-Based Network Management with SNMP," Proceedings of the EUNICE 2000 Summer School Sep. 13-15, 2000, p. 3.

EPO Feb. 25, 2011 Communication for EP09725288.6 (published as EP22777308); 4 pages.

EPO Aug. 15, 2011 Response to EPO Communication mailed Feb. 25, 2011 from European Patent Application No. 09725288.6; 15 pages.

EPO Nov. 3, 2011 Communication from European Application EP10710949.8; 2 pages.

EPO Mar. 12, 2012 Response to EP Communication dated Nov. 3, 2011 from European Application EP10710949.8; 15 pages.

EPO Mar. 20, 2012 Communication from European Application 09725288.6; 6 pages.

EPO Jul. 10, 2012 Response to EP Communication from European Application EP10723445.2.

EPO Sep. 24, 2012 Response to Mar. 20, 2012 EP Communication from European Application EP09725288.6.

PCT Sep. 25, 2007 Notification of Transmittal of the International Search Report from PCT/US06/45895.

(56) References Cited

OTHER PUBLICATIONS

PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 24, 2010 PCT International Search Report mailed Aug. 24, 2010 for PCT/US2010033880; 4 pages.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.
Wang, Robert and Jovan Popovic, "Desktop virtual reality," video clip, YouTube, posted by rkeltset on Apr. 8, 2010, 1 page; http://www.youtube.com/watch?v=9rBtm62Lkfk.
Wang, Robert and Jovan Popovic, "Gestural user input," video clip, YouTube, posted by rkeltset on May 19, 2010, 1 page; http://www.youtube.com/watch?v=3JWYTtBjdTE.
Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.
Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.
Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.
Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.
Weinstein et al., "Emerging Technologies for Teleconferencing and Telepresence," Wainhouse Research 2005 http://www.ivci.com/pdf/whitepaper-emerging-technologies-for-teleconferencing-and-telepresence.pdf.
Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.
WirelessDevNet, Melody Launches Bluetooth Over IP, [retrieved and printed on Jun. 5, 2010] http://www.wirelessdevnet.com/news/2001/155/news5.html; 2 pages.
Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.
Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.
Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.
Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf ; 10 pages.
Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.
Yegani, P. et al., "GRE Key Extension for Mobile IPv4," Network Working Group, Feb. 2006, 11 pages; http://tools.ietf.org/pdf/draft-yegani-gre-key-extension-01.pdf.
Yoo, Byounghun, et al., "Image-Based Modeling of Urban Buildings Using Aerial Photographs and Digital Maps," Transactions in GIS, 2006, 10(3): p. 377-394.
Zhong, Ren, et al., "Integration of Mobile IP and MPLS," Network Working Group, Jul. 2000, 15 pages; http://tools.ietf.org/html/draft-zhong-mobile-ip-mpls-01.
PRC Aug. 3, 2012 SIPO First Office Action from Chinese Application No. 200980119121.5; 16 pages.
PRC Dec. 18, 2012 Response to SIPO First Office Action from Chinese Application No. 200980119121.5; 16 pages.
"Oblong Industries is the developer of the g-speak spatial operation environment," Oblong Industries Information Page, 2 pages, [Retrieved and printed on Dec. 1, 2010] http://oblong.com.
Underkoffler, John, "G-Speak Overview 1828121108," video clip, Vimeo.com, 1 page, [Retrieved and printed on Dec. 1, 2010] http://vimeo.com/2229299.
Kramer, Kwindla, "Mary Ann de Lares Norris at Thinking Digital," Oblong Industries, Inc. Web Log, Aug. 24, 2010; 1 page; http://oblong.com/articles/OBS6hEeJmoHoCwgJ.html.
"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.
Kramer, Kwindla, "Oblong at TED," Oblong Industries, Inc. Web Log, Jun. 6, 2010, 1 page; http://oblong.com/article/OB22LFIS1NVyrOmR.html.
Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.
"John Underkoffler points to the future of UI," video clip and interactive transcript, Video on TED.com, Jun. 2010, 6 pages; http://www.ted.com/talks/john_underkoffler_drive_3d_data_with_a_gesture.html.
Kramer, Kwindla, "Oblong on Bloomberg TV," Oblong Industries, Inc. Web Log, Jan. 28, 2010, 1 page; http://oblong.com/article/0AN_1KD9q990PEnw.html.
Kramer, Kwindla, "g-speak at RISD, Fall 2009," Oblong Industries, Inc. Web Log, Oct. 29, 2009, 1 page; http://oblong.com/article/09uW060q6xRIZYvm.html.
Kramer, Kwindla, "g-speak+TMG," Oblong Industries, Inc. Web Log, Mar. 24, 2009, 1 page; http://oblong.com/article/08mM77zpYMm7kFtv.html.
"g-stalt version 1," video clip, YouTube.com, posted by zigg1es on Mar. 15, 2009, 1 page; http://youtube.com/watch?v=k8ZAql4mdvk.
Underkoffler, John, "Carlton Sparrell speaks at MIT," Oblong Industries, Inc. Web Log, Oct. 30, 2009, 1 page; http://oblong.com/article/09usAB4l1Ukb6CPw.html.

(56) References Cited

OTHER PUBLICATIONS

Underkoffler, John, "Carlton Sparrell at MIT Media Lab," video clip, Vimeo.com, 1 page, [Retrieved and printed Dec. 1, 2010] http://vimeo.com/7355992.
Underkoffler, John, "Oblong at Altitude: Sundance 2009," Oblong Industries, Inc. Web Log, Jan. 20, 2009, 1 page; http://oblong.com/article/08Sr62ron_2akg0D.html.
Underkoffler, John, "Oblong's tamper system 1801011309," video clip, Vimeo.com, 1 page, [Retrieved and printed Dec. 1, 2010] http://vimeo.com/2821182.
Feld, Brad, "Science Fact," Oblong Industries, Inc. Web Log, Nov. 13, 2008, 2 pages,http://oblong.com/article/084H-PKI5Tb914Ti.html.
Kwindla Kramer, "g-speak in slices," Oblong Industries, Inc. Web Log, Nov. 13, 2008, 6 pages; http://oblong.com/article/0866JqfNrFg1NeuK.html.
Underkoffler, John, "Origins: arriving here," Oblong Industries, Inc. Web Log, Nov. 13, 2008, 5 pages; http://oblong.com/article/085zBpRSY9JeLv2z.html.
Rishel, Christian, "Commercial overview: Platform and Products," Oblong Industries, Inc., Nov. 13, 2008, 3 pages; http://oblong.com/article/086E19gPvDcktAf9.html.
PCT May 30, 2013 International Preliminary Report on Patentability and Written Opinion from the International Searching Authority for International Application Serial No. PCT/US2011/061442 8 pages.
PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
PRC Jun. 18, 2013 Response to SIPO Second Office Action from Chinese Application No. 200980119121.5; 5 pages.
PCT Mar. 21, 2013 International Preliminary Report on Patentability from International Application Serial No. PCT/US2011/050380.
PRC Jan. 7, 2013 SIPO Second Office Action from Chinese Application Serial No. 200980105262.1.
PRC Apr. 3, 2013 SIPO Second Office Action from Chinese Application No. 200980119121.5; 16 pages.
PRC Jul. 9, 2013 SIPO Third Office Action from Chinese Application No. 200980119121.5; 15 pages.
PRC Sep. 24, 2013 Response to SIPO Third Office Action from Chinese Application No. 200980119121.5; 5 pages.
U.S. Appl. No. 14/055,427, filed Oct. 16, 2013, entitled "System and Method for Provisioning Flows in a Mobile Network Environment," Inventors: Balaji Vankat Vankataswami, et al.
U.S. Appl. No. 14/154,608, filed Jan. 14, 2014, entitled "System and Method for Extending Communications Between Participants in a Conferencing Environment," Inventors: Brian Baldino, et al.
PRC Aug. 28, 2013 SIPO First Office Action from Chinese Application No. 201080010988.X 7 pages.
PRC Nov. 26, 2013 SIPO First Office Action from Chinese Application No. 201080020670 5pgs.
U.S. Appl. No. 12/234,291, filed Sep. 19, 2008, entitled "System and Method for Enabling Communication Sessions in a Network Environment," Inventors: Yifan Gao et al.
U.S. Appl. No. 12/366,593, filed Feb. 5, 2009, entitled "System and Method for Depth Perspective Image Rendering," Inventors: J. William Mauchly et al.
U.S. Appl. No. 12/475,075, filed May 29, 2009, entitled "System and Method for Extending Communications Between Participants in a Conferencing Environment," Inventors: Brian J. Baldino et al.
U.S. Appl. No. 12/400,540, filed Mar. 9, 2009, entitled "System and Method for Providing Three Dimensional Video Conferencing in a Network Environment," Inventors: Karthik Dakshinamoorthy et al.
U.S. Appl. No. 12/400,582, filed Mar. 9, 2009, entitled "System and Method for Providing Three Dimensional Imaging in a Network Environment," Inventors: Shmuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, filed May 11, 2009, entitled "System and Method for Translating Communications Between Participants in a Conferencing Environment," Inventors: Marthinus F. De Beer et al.
U.S. Appl. No. 12/727,089, filed Mar. 18, 2010, entitled "System and Method for Enhancing Video Images in a Conferencing Environment," Inventor: Joseph T. Friel.
U.S. Appl. No. 12/784,257, filed May 20, 2010, entitled "Implementing Selective Image Enhancement," Inventors: Dihong Tian et al.
U.S. Patent Application Serial No. 12/7870,687 filed Aug. 27, 2010, entitled "System and Method for Producing a Performance Via Video Conferencing in a Network Environment," Inventors: Michael A. Arnao et al.
PCT "International Search Report and the Written Opinion of the International Searching Authority, or the Declaration," PCT/US2010/026456, dated Jun. 29, 2010, 11 pages.
PCT "Notification of Transmittal of the International Search Report and the Written Opinion of the International Searching Authority, or the Declaration," PCT/US2009/001070, dated Apr. 4, 2009, 14 pages.
PCT "Notification of Transmittal of the International Search Report and the Written Opinion of the International Searching Authority, or the Declaration," PCT/US2009/038310; dated Oct. 10, 2009; 17 pages.
PCT "International Preliminary Report on Patentability dated Sep. 29, 2009, International Search Report, and Written Opinion," for PCT International Application PCT/US2008/058079; dated Sep. 18, 2008, 10 pages.

\* cited by examiner

SYSTEM AND METHOD FOR PROVIDING DEPTH ADAPTIVE VIDEO CONFERENCING

TECHNICAL FIELD

This disclosure relates in general to the field of videoconferencing and, more particularly, to providing depth adaptive video conferencing.

BACKGROUND

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. Some issues have arisen in video conferencing scenarios where a group, rather than just an individual, needs to be clearly presented. Also, if participants are not tied to a desk or a conferencing table, but rather are free to stand and walk around, problems surface in choosing a suitable camera perspective. Deficient camera arrangements can lead to distorted or incomplete video images being sent to participants in a video conference. Hence, the ability to optimize cameras and video images provides a significant challenge to system designers, device manufacturers, and participants of video conferences.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes capturing panoramic image data through a first camera in a camera cluster, and capturing close-up image data through a second camera included as part of a spaced array of cameras. A presence of a user in a field of view of the second camera can be detected. The close-up image data and the panoramic image data can be combined to form a combined image. In more specific embodiments, the detecting includes evaluating a distance between the user and the second camera. The combined image can reflect a removal of a portion of panoramic image data associated with a user in a video conferencing environment.

In other embodiments, the method can include communicating the combined image over a network connection to a remote location. The remote location can receive and display the combined image. The method can also include dynamically scaling the close-up image data based on a distance between a user in a video conferencing environment and the second camera. The field of view of the second camera can be adjusted based on a detected distance of the user from the second camera. The field of view of the second camera can be adjusted by adjusting a zoom of the second camera.

Example Embodiments

Figure 1:
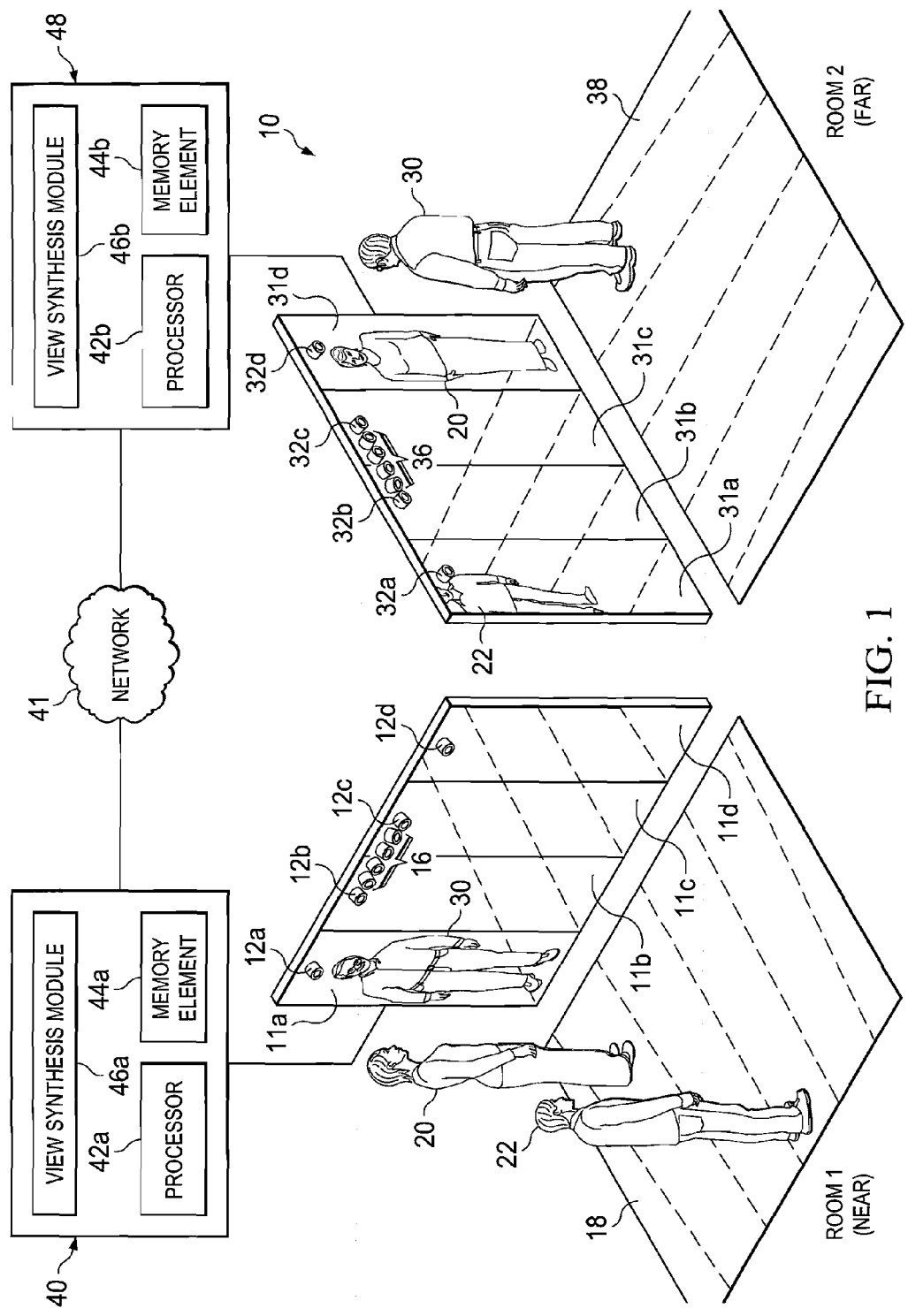
FIG. 1 is a simplified schematic diagram illustrating a system for providing depth adaptive video conferencing in accordance with one embodiment of the present disclosure.

Turning to FIG. 1, FIG. 1 is a simplified schematic diagram of a system 10 for providing depth adaptive video conferencing. FIG. 1 includes ROOM 1 in a first location and ROOM 2 (separate from ROOM 1) in a remote location. ROOM 1 may include an image display wall (e.g., a Telepresence wall) that includes a plurality of display panels 11a-11d. Mounted on each display panel 11a-11d is a spaced array arrangement of cameras 12a-12d. In addition, in the middle of the top of the image display wall is a camera cluster 16 of four area cameras in this particular example. A participation area 18, in which teleconference participants 20, 22 can freely move, is defined outward from the image display wall. System 10 may further include a server 40 for managing images from the cameras. Server 40 can include a processor 42a, a memory element 44a, and a view synthesis module 46a.

ROOM 1 is connected to ROOM 2 via a network connection 41 in this particular example. ROOM 2 may be setup similar to ROOM 1 with a corresponding image display wall having a plurality of display panels 31a-31d, a set of cameras 32a-32d, and a camera cluster 36 of four area cameras in this example. Note that in particular implementations, camera clusters 16 and 36 can be panoramic and angled to cover an entire room in a non-overlapping manner. Hence, the panoramic cameras can be centered, stacked (vertically or horizontally), angled, and/or provisioned in the center of a given wall display. A participation area 38 is also included in ROOM 2 and, further, is spaced outward from the image display wall for use by a participant 30 of ROOM 2 (e.g., during a conference). The network connection couples server 40 to server 48. Server 48 includes a processor 42b, a memory element 44b, and a view synthesis module 46b, where server 48 can readily interact with (and understand communications from) server 40.

In operation of an example associated with FIG. 1, each of display panels 11a-11d and 31a-31d can be large (e.g., 65-inch) plasma displays mounted on a wall and, further, subsequently turned 90° to offer a portrait style image. In most mountings, where the displays would be offset from the ground by several inches, the panel configuration is similar in size to a full-length mirror. The image display walls of FIG. 1 reflect a row of four of these displays: covering 10-15 feet of a wall. This deployment allows people to sit, stand, or walk around their respective rooms, where their image data is still captured by the image display walls. In a general sense, system 10 acts as a virtual portal (i.e., a window) between the two rooms utilizing two distinct modes: a whole-room mode and a face-to-face mode.

In a first mode, the participation areas 18, 38 can be imaged in a whole-room mode to offer suitable depth to the image data. Each respective set of display panels 11*a*-11*d*, 31*a*-31*d* can show a cohesive view of the entire room and, further, the people in the room. Note that in order to capture an entire room with a coherent perspective, a single viewpoint is preferred. Either a fish-eye lens or a cluster of co-located (i.e., panoramic) cameras can accomplish this objective. However, this single view alone creates a problem because, as participants approach the image display wall, particularly closer to either end of the image display wall, the panoramic camera captures their image data from a side view rather than from a frontal view.

In a second mode, participation areas 18, 38 can be imaged in a face-to-face mode. When people are in a deliberate (e.g., more intimate) conversation, they typically stand closer to each other. In videoconferencing scenarios, the tendency is to walk up closer to the image display wall and, further, attempt to maintain consistent eye contact with the counterparty. In order to get near-correct eye-gaze in a face-to-face video conference, the camera should be mounted close to (usually directly above) the image of the far-end person. Since the users are free to stand in front of any part (i.e., any panel) of the video wall, this would require a group of cameras: distributed across the face of the display wall. However, a group of such cameras can present an inconsistent picture of a room. Objects in the back of the room appear in several cameras, as the fields of view overlap there. An array of cameras can produce a number of images of the same scene from different viewpoints. They cannot be combined or stitched into one coherent picture.

In accordance with certain teachings of the present disclosure, system 10 can utilize a varying combination of panoramic images from the whole-room mode with close-up images from the face-to-face mode. Cluster systems 16, 36 of cameras mounted in the middle of the top of the respective image display wall can effectively capture the panoramic image of the entire room. Operationally, the video images emanating from the combination of the panoramic cameras and the close-up cameras can be combined in an intelligent manner to create the video images (i.e., combined images) that are transmitted to a distant endpoint. In particular, when a person is close to the image display wall, the close-up camera nearest to him can be activated, where that image is transmitted to a corresponding panel at the distant endpoint. In other instances, when no person is close to the wall, the panoramic image of the room is displayed across all the panels of the distant endpoint. Hence, system 10 is configured to intelligently support two modes of image capture (e.g., whole room and face-to-face). This can be accomplished by leveraging two different camera configurations: panoramic and face-to-face (close-up). The respective video images can be combined digitally in a way that adapts to the presence and, further, the location of people in the conferencing room.

In terms of its potential physical deployment, system 10 can include a wall display with two groups of cameras: panoramic cameras and close-up cameras. A panoramic camera cluster can be mounted in a central location (e.g., about 6.5 feet from the floor on the display wall, capturing most of the room). The display wall can be divided into a number of panels approximately (e.g., three feet in width). Each panel can be provisioned with a close-up camera directly over it. An algorithm for combining video images (e.g., provided by view synthesis modules 46*a*-*b*) can intuitively render accurate image data to corresponding participants. More specifically, the location of the people in the room can be tracked visually. As a person approaches one of the display panels (e.g., a selected distance [such as within 6 feet of one of the panels]), a personal view is selected for the video stream corresponding to that panel, which is the video stream being sent to the far location of the video conference.

When a personal view is selected, the image of the person in the corresponding personal camera is segmented: removing the background imagery (e.g., from the panoramic image data) and leaving the foreground (i.e., the person). The image of the person can be scaled according to their physical distance from the camera in such a way as to make them approximately lifesize. The image of the person can subsequently be matted on top of the image from the panoramic camera, corresponding to that panel. In regards to the far endpoint, the corresponding users would see a coherent panoramic view of the room, spread across their video wall: except in one panel. In that panel, they see an intelligent rendering of their counterparty, as viewed from the close-up camera with the panoramic room behind them.

In essence, system 10 can leverage two sets of cameras with overlapping field of view coverage. System 10 switches (i.e., adaptively) between cameras based on the position of the people within the imaging environment. The architecture can use cameras distributed across the surface of a display wall for tracking people proximate to the display wall. It can also use centrally co-located cameras for tracking people that are farther from the wall.

Note that system 10 stands in contrast to camera systems that independently switch when a person is in view, or when that person is detected. The architecture of system 10 can use a cluster of co-located cameras to maintain a consistent perspective view of the room across the entire display surface. Operationally, the close-up cameras can be positioned, assigned to the display surface, and/or switched in a way to maintain (as much as possible) the coherent perspective. The close-up cameras can achieve a face-to-face image with superior eye contact, which would be otherwise impossible with only co-located cameras.

In the most basic system, the close-up view is simply switched into the video stream: replacing the panoramic view. This action can be triggered by the detection of a person in the close-up region. In a more particular embodiment, enhanced processing can occur to produce the video image when the close-up up camera is engaged. The image of the person can be isolated using foreground/background separation processing. In the case of image segmentation, the image of the person may be superimposed on an image of the background scene from the perspective of the panoramic camera cluster. Again, enhanced processing can occur to produce the video image when the close-up up camera is engaged. The images of the person can be scaled dynamically according to their distance from the display wall. In this way their image does not become overly magnified, as they move closer to the display wall.

In one implementation, servers 40 and 48 include software to achieve (or to foster) the intelligent depth adaptive functions (and the field of view enhancements), as outlined herein in this Specification. Note that in one example, each of these elements can have an internal structure (e.g., a processor, a memory element, etc.) to facilitate some of the operations described herein. In other embodiments, these depth adaptive functions (and the field of view enhancements) may be executed externally to these elements, or included in some other network element to achieve this intended functionality. Alternatively, servers 40 and 48 and/or cameras 12*a*-*d*, cameras 32a-d (and any camera within camera cluster 16 and 36) may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 2:
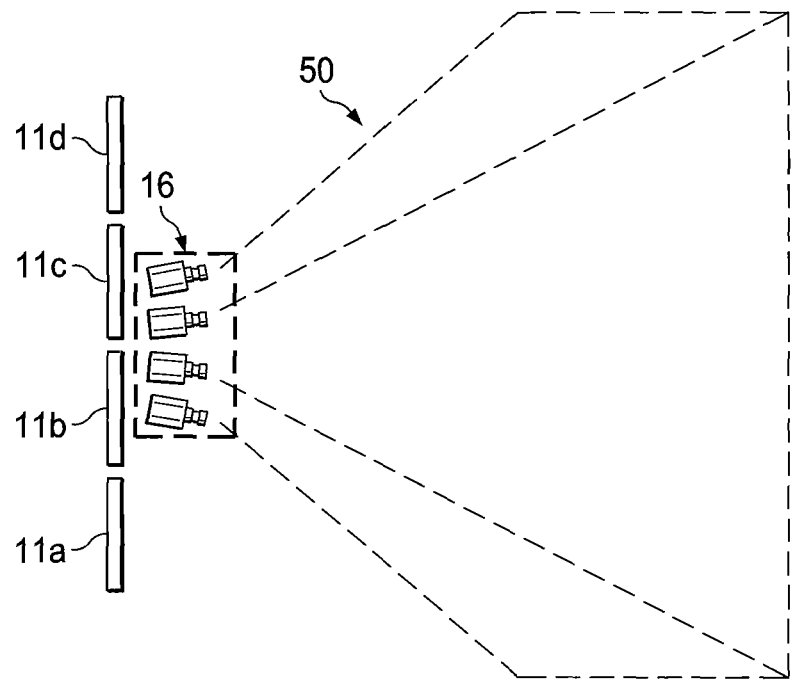
FIG. 2 is a simplified schematic diagram illustrating a cluster of cameras associated with the depth adaptive video conferencing system in accordance with one embodiment of the present disclosure.

Referring now to FIG. 2, a simplified schematic diagram of camera cluster 16 is provided in accordance with one embodiment of the present disclosure. For illustration purposes in this schematic, camera cluster 16 is shown separated from display panels 11a-11d; however, the cameras of camera cluster 16 can be mounted on the front of display panels 11a-11d, as depicted in FIG. 1. Each camera of camera cluster 16 can be positioned to capture images of a certain part of participation area 38. This is represented in a hashed area 50, where each of the cameras of camera cluster 16 (e.g., from top to bottom) are positioned to capture the corresponding top-to-bottom area defined within hashed area 50. These images can be continuously fed to a server, as discussed in detail below. Before turning to additional operations associated with system 10, a brief discussion is provided about the possible infrastructure that may be provisioned in conjunction with the present disclosure.

In one particular example, cameras 12a-12d, 32a-d (and the additional cameras of camera clusters 16, 36) are video cameras configured to capture, record, maintain, cache, receive, and/or transmit image data. This could include transmitting packets over network 41 to any suitable next destination. The captured/recorded image data could be stored in the individual cameras, or be provided in some suitable storage area (e.g., a database, a server, etc.). In one particular instance, cameras 12a-12d, 32a-d (and the additional cameras of camera clusters 16, 36) can be their own separate network device and have a separate IP address. Cameras 12a-12d, 32a-d (and the additional cameras of camera clusters 16, 36) could be wireless cameras, high-definition cameras, or any other suitable camera device configured to capture image data. In terms of their physical deployment, in one particular implementation, cameras 12a-12d, 32a-32d are close-up cameras, which are mounted near the top (and at the center of) display panels 11a-11d and 31a-31d. One camera can be mounted to each display. Other camera arrangements and camera positioning is certainly within the broad scope of the present disclosure.

Cameras 12a-12d, 32a-d (and the additional cameras of camera clusters 16, 36) may interact with (or be inclusive of) devices used to initiate a communication for a video session, such as a switch, a console, a proprietary endpoint, a microphone, a dial pad, a bridge, a telephone, a smartphone (e.g., Google Droid, iPhone, etc.), an iPad, a computer, or any other device, component, element, or object capable of initiating video, voice, audio, media, or data exchanges within system 10. Cameras 12a-12d, 32a-d (and the additional cameras of camera clusters 16, 36) can also be configured to include a receiving module, a transmitting module, a processor, a memory, a network interface, a call initiation and acceptance facility such as a dial pad, one or more speakers, one or more displays, etc. Any one or more of these items may be consolidated, combined, or eliminated entirely, or varied considerably and those modifications may be made based on particular communication needs.

Note that in one example, cameras 12a-12d, 32a-d (and the additional cameras of camera clusters 16, 36) can have internal structures (e.g., with a processor, a memory element, etc.) to facilitate some of the operations described herein. In other embodiments, these video image enhancements features may be provided externally to these cameras or included in some other device to achieve this intended functionality. In still other embodiments, cameras 12a-12d, 32a-d (and the additional cameras of camera clusters 16, 36) may include any suitable algorithms, hardware, software, components, modules, interfaces, or objects that facilitate the operations thereof.

Note that the term 'camera cluster' is not intended to require a certain number or type of cameras be utilized. Rather, a camera cluster simply identifies two or more cameras used to capture image data. For example, a first camera cluster for capturing a panoramic image could be one camera with a fish-eye type lens, and/or four separate cameras capturing the same viewing angles as could be captured by the fish-eye type camera. Additionally, as used herein in this Specification, 'panoramic image data' is a broad term meant to connote video data of a given area or environment, whereas the term 'up-close image data' is similarly broad and representative of video data that may be associated with objects somewhat closer to a given camera (or wall). Hence, up-close image data and panoramic image data are broad terms that in some instances, may share some overlapping coverage, video data, etc., or be separated.

In operational terms, close-up camera switching may be controlled by various mechanisms, depending on the environment and desired complexity. These can include face detection that operates on the close-up cameras video signal. These mechanisms can also include depth sensors at the display surface (e.g., a time-of-flight depth camera). These mechanisms can also include floor sensors, position sensing using overhead cameras, or any other suitable mechanism to achieve this objective. In terms of the dynamic field of view, the close-up cameras can be provisioned in an array across the top of a display wall. In one particular instance, these can be spaced apart (e.g., approximately three feet apart, or any other suitable distance), where each camera can be centrally located over a flat-panel display mounted portrait style. The field of view (FOV) of these cameras is important and, further, in a particular instance the FOV can be equivalent to magnification or zoom. Other examples may include different provisioning arrangements for the FOV.

Displays 11a-11d and 31a-31d are screens at which video data can be rendered for the end user. Note that as used herein in this Specification, the term 'display' is meant to connote any element that is capable of delivering image data (inclusive of video information), text, sound, audiovisual data, etc. to an end user. This would necessarily be inclusive of any panel, plasma element, television, monitor, computer interface, screen, TelePresence devices (inclusive of TelePresence boards, panels, screens, surfaces, etc.) or any other suitable element that is capable of delivering/rendering/projecting such information. Note also that the term 'image data' is meant to include any type of media or video (or audio-video) data applications (provided in any protocol or format) that could operate in conjunction display panels 11a-11d and 31a-31d.

Network 41 represents a series of points or nodes of interconnected communication paths for receiving and transmitting packets of information that propagate through system 10. Network 41 offers a communicative interface between any of the components of FIG. 1 and remote sites, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. Note that in using network 41, system 10 may include a configuration capable of transmission control protocol/internet protocol (TCP/IP) communications for the transmission and/or reception of packets in a network. System 10 may also operate in conjunction with a user datagram protocol/IP (UDP/IP) or any other suitable protocol, where appropriate and based on particular needs.

Servers 40, 48 are configured to receive information from cameras 12a-12d, 32a-d, and camera clusters 16, 36 (e.g., via some connection that may attach to an integrated device (e.g., a set-top box, a proprietary box, etc.) that sits atop the display and that includes [or that may be part of] cameras 12a-12d, 32a-d and camera clusters 16, 36). Servers 40, 48 may also be configured to control compression activities, or additional processing associated with data received from the cameras (inclusive of the camera clusters). Alternatively, the actual integrated device can perform this additional processing before image data is sent to its next intended destination. Servers 40, 48 can also be configured to store, aggregate, process, export, and/or otherwise maintain image data and logs in any appropriate format, where these activities can involve respective processors 42a-b, memory elements 44a-b, and view synthesis modules 46a-b. Servers 40, 48 are network elements that facilitate data flows between endpoints and a given network. As used herein in this Specification, the term 'network element' is meant to encompass routers, switches, gateways, bridges, loadbalancers, firewalls, servers, processors, modules, or any other suitable device, component, element, or object operable to exchange information in a network environment. This includes proprietary elements equally.

Servers 40, 48 may interface with the cameras and the camera clusters through a wireless connection, or via one or more cables or wires that allow for the propagation of signals between these two elements. These devices can also receive signals from an intermediary device, a remote control, etc. and the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between servers 40, 48 and the cameras and the camera clusters. Transmissions between these two sets of devices can be bidirectional in certain embodiments such that the devices can interact with each other (e.g., dynamically, real-time, etc.). This would allow the devices to acknowledge transmissions from each other and offer feedback, where appropriate. Any of these devices can be consolidated with each other, or operate independently based on particular configuration needs.

Figure 3:
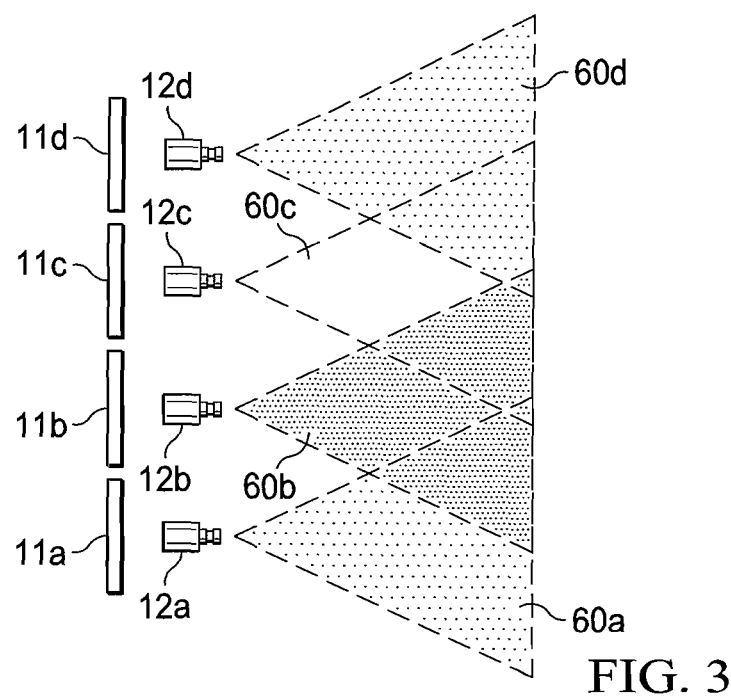
FIG. 3 is a simplified schematic diagram illustrating a spaced array of cameras associated with the depth adaptive video conferencing system in accordance with one embodiment of the present disclosure.

Referring now to FIG. 3, a simplified schematic diagram of the arrangement of close-up cameras 12a-12d is illustrated in accordance with one embodiment of the present disclosure. For illustration purposes, cameras 12a-12d are shown separated from the display panels 11a-11d. Cameras 12a-12d are arranged so that each camera can capture images of the area in front of each respective camera. Each camera 12a-12d has a corresponding field of view, which has been depicted as a hashed line triangle 60a-60d for each respective camera.

In particular implementations, the images from each of close-up cameras 12a-12d may be sent to server 40, which may include a proximity detection mechanism in order to identify when a person comes within a certain designated distance (for example, six feet) of a particular camera. When the system recognizes that a person has entered this zone, that particular image is then utilized and, further, combined with the panoramic image to form the combined image of ROOM 1. It should be noted that the configuration of system 10 can utilize any appropriate mechanism for determining if a person/user is within a certain distance of a camera. For example, depth sensors (e.g., such as a time-of-flight depth cameras), at the display surface could be utilized. Alternatively, floor sensors could be mounted in participation area 18 to detect the location of people in the room. Another option would be utilizing a position sensing system of overhead cameras. Any such permutations are clearly within the broad scope of the present disclosure.

Figure 4:
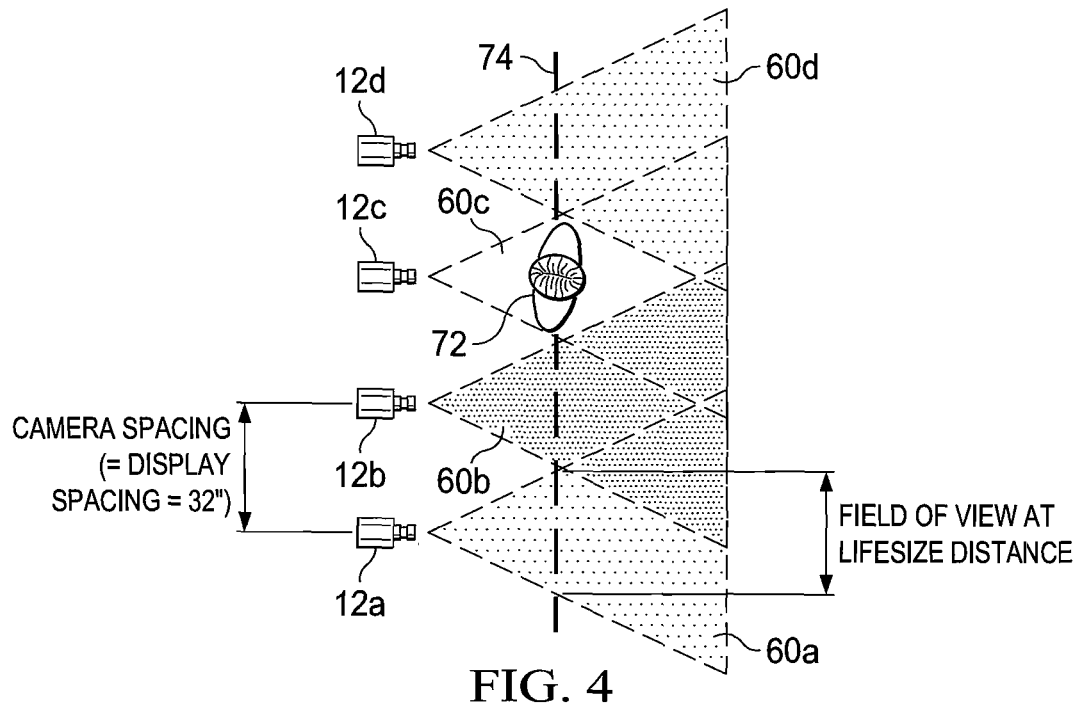
FIG. 4 is a simplified schematic diagram illustrating a video conference participant at lifesize distance from the spaced array cameras in accordance with one embodiment of the present disclosure.

Referring now to FIG. 4, a simplified schematic diagram is shown, illustrating a video conference participant 72 at a distance from spaced array cameras 12a-12d. As depicted, each field of view 60a-60d has portions that overlap other triangles, and portions that do not. Note that the lifesize distance identifies the distance from cameras 12a-12d, where the respective fields of view 60a-60d converge. This is represented in FIG. 4 as a hashed line 74. When participant 72 stands at a lifesize distance in front of a single camera 12c, only that camera's signal would be intelligently combined with the panoramic image data.

Figure 5:
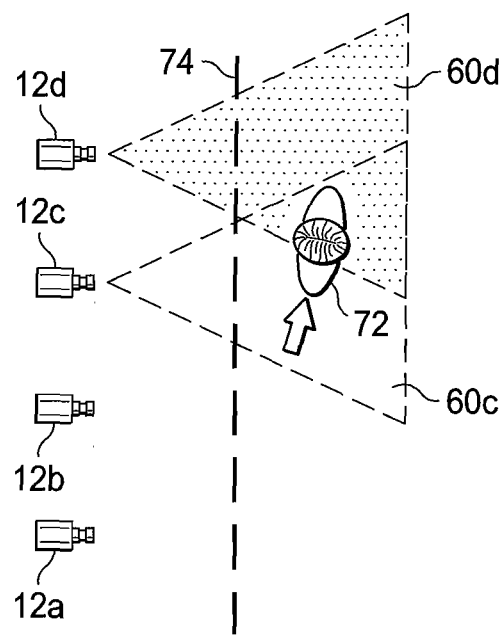
FIG. 5 is a simplified schematic diagram illustrating a video conference participant at a greater than lifesize distance from the spaced array cameras in accordance with one embodiment of the present disclosure.

However, when participant 72 moves, the process can become more complex. Referring now to FIG. 5, participant 72 is shown moving to the area where the fields of view 60c, 60d of two cameras 12c, 12d overlap each other. Therefore, at least some of the same portions of the participant can appear in the image captured by both cameras 12c, 12d: making the image of participant 72 appear distorted in the combined image. For example, in the example of FIG. 5, it appears that 100% of participant 72 is in field of view 60c and about 75% of participant 72 is in field of view 60d. This would mean that 175% of participant 72 would show up in the corresponding displays of the remote room (e.g., ROOM 2 of FIG. 1). To compensate for this problematic issue, system 10 can adjust fields of view 60a-60d of cameras 12a-12d.

Figure 6:
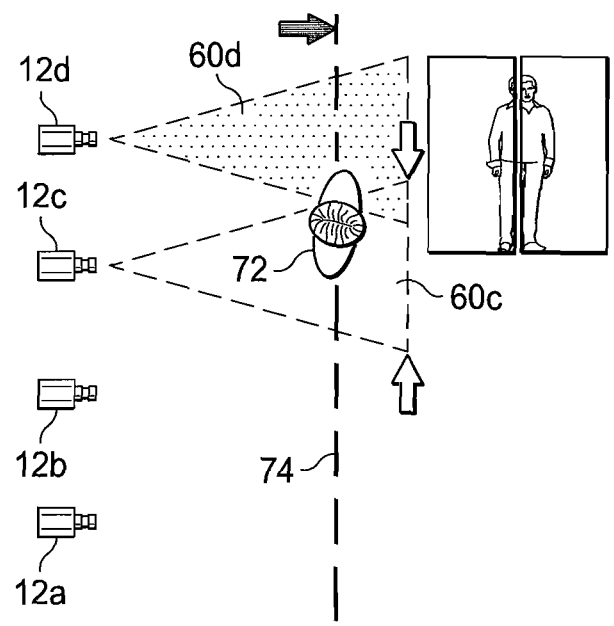
FIG. 6 is a simplified schematic diagram illustrating a video conference participant at a lifesize distance from the spaced array cameras after the cameras' field of view has been adjusted.

Referring now to FIG. 6, modified fields of view are shown, where a modified lifesize distance is also shown. FIG. 6 further includes an image of what the end display in ROOM 2 would render. System 10 is able to utilize the distance information discussed above to identify the distance between the associated cameras and the targeted participant. The zoom of the corresponding camera can then be adjusted automatically to narrow or to expand the fields of view, as needed to place the lifesize distance at the same distance from the cameras as the participant. It may be that this zoom adjust occurs simultaneously and equally in all four close-up cameras in particular implementations. This can result in the participant being represented on the displays in the remote room (e.g., ROOM 2) as accurately as possible.

Figure 7:
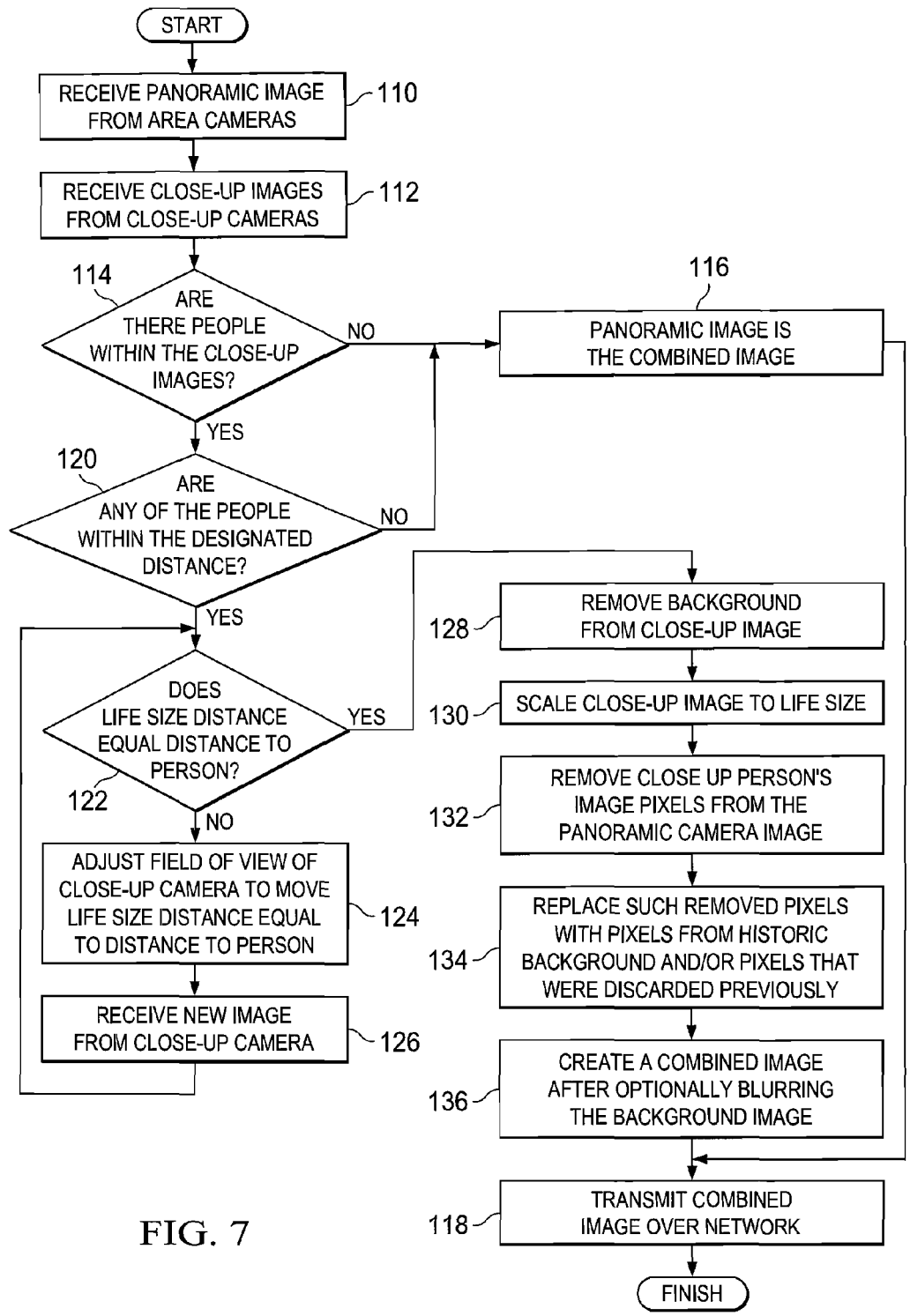
FIG. 7 is a simplified flow diagram illustrating potential operations associated with the system.

FIG. 7 is a simplified flow diagram illustrating one potential operation associated with the present disclosure. The flow may begin at step 110, where camera cluster 16 receives an image of a participation area of a first room, and sends this image to server 40. At step 112, the close-up cameras receive images of their respective areas, and send those close-up images to a server (e.g., server 40). View synthesis module 46a can examine the close-up images to determine if there are any people present at step 114. If there are no users present, the panoramic image becomes the combined image at step 116. That combined image is then ready to be transmitted to the second room at step 118, and appropriately displayed on displays of the second room.

Alternatively, if individuals are detected by view synthesis module 46a, the distance from the camera to the respective person can subsequently be determined at step 120. If a person is outside of the designated distance, the panoramic image can become the combined image at step 116. That combined image is then ready to be transmitted to the second room at step 118, and suitably displayed on displays of the second room. However, if a person is within the designated distance, the distance to the person can be compared to the current lifesize distance in step 122. Then, in step 124, if the lifesize distance is not equal to the distance to the person, the fields of view of the close-up cameras can be adjusted to make those distances equal. Subsequently, a new image is taken by the close-up cameras, and received by server 40 in step 126. The lifesize distance is then compared again at step 122. If the lifesize distance and distance to the person are equal, the background can be removed from the close-up image (e.g., by view synthesis module 46a) at step 128.

At this juncture, the close-up image consists simply of the foreground of that original image (i.e., the person). In step 130, this image can be scaled to make it appear (approximately) life sized. In step 132, the system can remove the close up person's image pixels from the panoramic camera image. At step 134, the system can replace the removed pixels with pixels from the historic background and/or pixels that were discarded previously (e.g., in step 128). At step 136, a combined image is created after optionally blurring the background image. That combined image is then ready to be transmitted to the second room at step 118. The combined image can be rendered on the displays of the second room. A similar (reciprocal) process can be occurring in the second room. This could involve operations being performed by server 48 (e.g., with the assistance of view synthesis module 46b). The combined image from that process can be suitably transmitted to the first room for rendering on displays provisioned in the first room.

Note that in certain example implementations, the field of view adjustment functions (and the intelligent depth adaptive activities) outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, servers 40 and 48 and/or cameras 12a-12d, 32a-32d (inclusive of any camera within the aforementioned clusters) can include software in order to achieve the field of view adjustment functions (and the intelligent depth adaptive activities) outlined herein. This can be provided through instances of view synthesis modules 46a, 46b. Additionally, each of these devices may include a processor that can execute software or an algorithm to perform the depth adaptive (and field of view enhancement) activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each of synthesis modules 46a, 46b and cameras 12a-12d, 32a-32d (inclusive of any camera within the aforementioned clusters) can also include suitable interfaces for receiving, transmitting, and/or otherwise communicating data or information in a network environment.

Note that with the example provided above, as well as numerous other examples provided herein, interaction may be described in terms of two or three components. However, this has been done for purposes of clarity and example only. In certain cases, it may be easier to describe one or more of the functionalities of a given set of flows by only referencing a limited number of components. It should be appreciated that system 10 (and its teachings) are readily scalable and can accommodate a large number of components, participants, rooms, endpoints, sites, etc., as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible conferencing scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

For example, although cameras 12a-12d, 32a-d, and camera clusters 16, 36 have been described as being mounted in a particular fashion, these cameras could be mounted in any suitable manner in order to capture image data from an effective viewpoint. Other configurations could include suitable wall mountings, aisle mountings, furniture mountings, cabinet mountings, etc., or arrangements in which cameras and/or optics element would be appropriately spaced or positioned to perform its functions. Additionally, system 10 can have direct applicability in TelePresence environments (both large and small [inclusive of consumer applications]) such that quality image data can be appropriate managed during video sessions. Moreover, although system 10 has been illustrated with reference to particular elements and operations that facilitate the communication process, these elements and operations may be replaced by any suitable architecture or process that achieves the intended functionality of system 10.

What is claimed is:

1. A method, comprising:
 capturing panoramic image data through a first camera in a camera cluster, wherein the camera cluster includes the first camera and a plurality of close-up cameras, wherein the panoramic image data includes background imagery, wherein the camera cluster is located on a display wall that includes a plurality of display panels, wherein a close-up region is associated with each display panel in the plurality of display panels, wherein each display panel includes at least one close-up camera from the plurality of close-up cameras to capture close-up image data of the close-up region associated with the display panel when a presence of a user is detected in the close-up region;

capturing close-up image data through a second camera associated with a first display panel when the presence of the user is detected in a close-up region associated with the first display panel, wherein the background imagery is removed from the close-up image data, wherein the second camera is included in the plurality of close-up cameras;

scaling the close-up image data based on a distance between the user and the second camera; and combining the close-up image data and the panoramic image data to form a combined image.

2. The method of claim 1, wherein the user is detected in the close-up region by at least evaluating a distance between the user and the second camera.

3. The method of claim 1, wherein the combined image reflects a matting of the close-up image data onto the panoramic image data.

4. The method of claim 1, further comprising:
communicating the combined image over a network connection to a remote location, wherein the remote location receives and displays the combined image.

5. The method of claim 1, further comprising:
adjusting a field of view of the second camera based on a detected distance of the user from the second camera.

6. The method of claim 5, wherein the field of view of the second camera is adjusted by adjusting a zoom of the second camera.

7. Logic encoded in one or more non-transitory tangible media that includes code for execution and when executed by a processor operable to perform operations comprising:
capturing panoramic image data through a first camera in a camera cluster, wherein the camera cluster includes the first camera and a plurality of close-up cameras, wherein the panoramic image data includes background imagery, wherein the camera cluster is located on a display wall that includes a plurality of display panels, wherein a close-up region is associated with each display panel in the plurality of display panels, wherein each display panel includes at least one close-up camera from the plurality of close-up cameras to capture close-up image data of the close-up region associated with the display panel when a presence of a user is detected in the close-up region;

capturing close-up image data through a second camera associated with a first display panel when the presence of the user is detected in a close-up region associated with the first display panel, wherein the background imagery is removed from the close-up image data, wherein the second camera is included in the plurality of close-up cameras;

scaling the close-up image data based on a distance between the user and the second camera; and combining the close-up image data and the panoramic image data to form a combined image.

8. The logic of claim 7, wherein the user is detected in the close-up region by at least evaluating a distance between the user and the second camera.

9. The logic of claim 7, wherein the combined image reflects a matting of the close-up image data onto the panoramic image data.

10. The logic of claim 7, the operations further comprising:
communicating the combined image over a network connection to a remote location, wherein the remote location receives and displays the combined image.

11. The logic of claim 7, the operations further comprising:
adjusting a field of view of the second camera based on a detected distance of the user from the second camera.

12. An apparatus, comprising:
a memory element configured to store data,
a processor operable to execute instructions associated with the data, and
a view synthesis module, the apparatus being configured to:
capture panoramic image data through a first camera in a camera cluster, wherein the camera cluster includes the first camera and a plurality of close-up cameras, wherein the panoramic image data includes background imagery, wherein the camera cluster is located on a display wall that includes a plurality of display panels, wherein a close-up region is associated with each display panel in the plurality of display panels, wherein each display panel includes at least one close-up camera from the plurality of close-up cameras to capture close-up image data of the close-up region associated with the display panel when a presence of a user is detected in the close-up region;
capture close-up image data through a second camera associated with a first display panel when the presence of the user is detected in a close-up region associated with the first display panel, wherein the background imagery is removed from the close-up image data, wherein the second camera is included in the plurality of close-up cameras;
scale the close-up image data based on a distance between the user and the second camera; and
combine the close-up image data and the panoramic image data to form a combined image.

13. The apparatus of claim 12, wherein the user is detected in the close-up region by at least evaluating a distance between the user and the second camera.

14. The apparatus of claim 12, wherein the combined image reflects a matting of the close-up image data onto the panoramic image data.

15. The apparatus of claim 12, the apparatus being further configured to:
communicate the combined image over a network connection to a remote location, wherein the remote location receives and displays the combined image.

16. The method of claim 1, where a field of view of each camera in the camera cluster does not overlap with another field of view of another camera in the camera cluster.

17. The method of claim 1, wherein the close-up image data captures a standing image of the user.

18. The method of claim 1, wherein the combined image includes a consistent perspective view of a room that includes the plurality of display panels.

19. The method of claim 1, wherein the plurality of display panels includes the first display panel and a second display panel and the method further comprises:
capturing close-up image data through a third camera associated with the second display panel when the presence of a second user is detected in a close-up region associated with the second display panel, wherein the background imagery is removed from the close-up image data.

* * * * *